United States Patent
Alanqari et al.

(10) Patent No.: US 11,820,707 B2
(45) Date of Patent: *Nov. 21, 2023

(54) GEOPOLYMER CEMENT SLURRIES, CURED GEOPOLYMER CEMENT AND METHODS OF MAKING AND USE THEREOF

(71) Applicant: Saudi Arabian Oil Company, Dhahran (SA)

(72) Inventors: Khawlah A. Alanqari, Al-Khubar (SA); Abdullah S. Al-Yami, Dhahran (SA)

(73) Assignee: Saudi Arabian Oil Company, Dhahran (SA)

( * ) Notice: Subject to any disclaimer, the term of this patent is extended or adjusted under 35 U.S.C. 154(b) by 187 days.

This patent is subject to a terminal disclaimer.

(21) Appl. No.: 16/822,625

(22) Filed: Mar. 18, 2020

(65) Prior Publication Data

US 2021/0292230 A1   Sep. 23, 2021

(51) Int. Cl.
| | |
|---|---|
| C04B 12/00 | (2006.01) |
| C04B 14/04 | (2006.01) |
| C04B 14/14 | (2006.01) |
| C04B 14/30 | (2006.01) |
| C04B 28/00 | (2006.01) |
| C04B 28/26 | (2006.01) |

(52) U.S. Cl.
CPC .......... *C04B 12/005* (2013.01); *C04B 14/041* (2013.01); *C04B 14/14* (2013.01); *C04B 14/30* (2013.01); *C04B 28/006* (2013.01); *C04B 28/26* (2013.01); *C04B 2201/52* (2013.01)

(58) Field of Classification Search
CPC ..... C04B 12/005; C04B 14/041; C04B 14/14; C04B 14/30; C04B 2201/52; C04B 28/021; C04B 28/006; C04B 28/26; C04B 12/00; C04B 14/04; C04B 20/00; C04B 24/12; C04B 24/28; C09K 8/02; C09K 8/032; C09K 8/14; C09K 8/504; C09K 8/57; C09K 8/46; C09K 8/473; E21B 111/003; E21B 33/138; Y02P 40/10
See application file for complete search history.

(56) References Cited

U.S. PATENT DOCUMENTS

| | | | |
|---|---|---|---|
| 394,202 A | 12/1888 | Miller | |
| 745,512 A | 12/1903 | Arthur | |
| 3,499,491 A | 3/1970 | Wyant et al. | |
| 3,557,876 A | 1/1971 | Tragesser | |
| 3,605,898 A | 9/1971 | Harrison et al. | |
| 3,798,191 A | 3/1974 | Donelly | |
| 4,509,985 A * | 4/1985 | Davidovits | C04B 28/006 |
| | | | 106/624 |
| 4,547,298 A | 10/1985 | Novak | |
| 4,760,882 A | 8/1988 | Novak | |
| 4,883,125 A | 11/1989 | Wilson et al. | |
| 4,953,620 A | 9/1990 | Bloys et al. | |
| 5,076,852 A | 12/1991 | Bloys et al. | |
| 5,295,543 A | 3/1994 | Terry et al. | |
| 5,320,171 A | 6/1994 | Laramay | |
| 5,358,044 A | 10/1994 | Hale et al. | |
| 5,361,841 A | 11/1994 | Hale et al. | |
| 5,398,758 A | 3/1995 | Onan et al. | |
| 5,421,409 A | 6/1995 | Mueller et al. | |
| 5,501,277 A | 3/1996 | Onan et al. | |
| 5,911,282 A | 6/1999 | Onan et al. | |
| 5,959,061 A | 9/1999 | Neumann et al. | |
| 6,448,206 B1 | 9/2002 | Griffith et al. | |
| 6,615,918 B2 | 9/2003 | Bayliss et al. | |
| 7,013,973 B2 | 3/2006 | Danican et al. | |
| 7,458,424 B2 | 12/2008 | Odeh et al. | |
| 7,631,632 B2 | 12/2009 | Arov | |
| 7,794,537 B2 | 9/2010 | Barlet-Gouedard et al. | |
| 7,846,250 B2 | 12/2010 | Barlet-Gouedard et al. | |
| 7,926,567 B2 | 4/2011 | Harris et al. | |
| 7,934,557 B2 | 5/2011 | Nguyen | |
| 7,954,549 B2 | 6/2011 | Lende et al. | |

(Continued)

FOREIGN PATENT DOCUMENTS

| | | |
|---|---|---|
| CN | 1872766 A | 12/2006 |
| CN | 105884306 A | 8/2016 |

(Continued)

OTHER PUBLICATIONS

Juhyuk Moon, Sungchul Bae, Kemal Celik, Seyoon Yoon, Ki-Hyun Kim, Kang Su Kim, Paulo J.M. Monteiro, Characterization of natural pozzolan-based geopolymeric binders, Cement and Concrete Composites, V 53, 2014 pp. 97-104, DOI:10.1016/j.cemconcomp.2014.06.010. (Year: 2014).*

PL-226104-B1, machine translation (Year: 2017).*

B Lavanya et al 2020 IOP Conf. Ser.: Mater. Sci. Eng. 872 012141 <URL:https://iopscience.iop.org/article/10.1088/1757-899X/872/1/012141> (Year: 2020).*

Khan et al., "Effect of Fineness of Basaltic Volcanic Ash on Pozzolanic Reactivity, ASR Expansion and Drying Shrinkage of Blended Cement Mortars," Materials, p. 1-21; Aug. 15, 2019. <URL: https://www.mdpi.com/1996-1944/12/16/2603>(Year: 2019).*

(Continued)

*Primary Examiner* — Bryan D. Ripa
*Assistant Examiner* — Marites A Guino-O Uzzle
(74) *Attorney, Agent, or Firm* — DINSMORE & SHOHL LLP

(57) ABSTRACT

Geopolymer cement slurries, cured geopolymer cements, and methods of making cured geopolymer cement and methods of using geopolymer cement slurries are provided. The geopolymer cement slurry comprises cement precursor material, Saudi Arabian volcanic ash, and an aqueous solution. The Saudi Arabian volcanic ash comprises $SO_3$, CaO, $SiO_2$, $Al_2O_3$, $Fe_2O_3$, MgO, and $K_2O$.

19 Claims, No Drawings

(56) References Cited

U.S. PATENT DOCUMENTS

| | | | |
|---|---|---|---|
| 8,273,426 | B1 | 9/2012 | Laramay et al. |
| 8,664,285 | B2 | 3/2014 | Birnbrich et al. |
| 8,703,659 | B2 | 4/2014 | Dalrymple et al. |
| 8,887,808 | B2 | 11/2014 | Kumar et al. |
| 9,006,151 | B2 | 4/2015 | Amanullah et al. |
| 9,023,150 | B2 | 5/2015 | Brenneis et al. |
| 9,045,965 | B2 | 6/2015 | Patil et al. |
| 9,133,386 | B2 | 9/2015 | Kumar et al. |
| 9,222,010 | B2 | 12/2015 | Porcherie et al. |
| 9,255,031 | B2 | 2/2016 | Pisklak et al. |
| 9,321,687 | B2 | 4/2016 | Gupta et al. |
| 9,376,901 | B2 | 6/2016 | Pantano |
| 9,410,066 | B2 | 8/2016 | Ghassemzadeh |
| 9,505,972 | B2 | 11/2016 | Iverson et al. |
| 9,695,653 | B2 | 7/2017 | Amanullah et al. |
| 9,840,653 | B2 | 12/2017 | Chatterji et al. |
| 9,863,231 | B2 | 1/2018 | Hull et al. |
| 9,890,082 | B2 | 2/2018 | Dubey |
| 9,932,510 | B2 | 4/2018 | Walker et al. |
| 9,957,434 | B2 | 5/2018 | van Oort et al. |
| 10,005,949 | B2 | 6/2018 | Roddy |
| 10,017,418 | B2 | 7/2018 | Thomas et al. |
| 10,035,945 | B2 | 7/2018 | Scorsone et al. |
| 10,053,612 | B2 | 8/2018 | Agapiou et al. |
| 10,077,636 | B2 | 9/2018 | Marr et al. |
| 10,081,755 | B2 | 9/2018 | Ballard |
| 10,087,107 | B2 | 10/2018 | Allouche et al. |
| 10,087,353 | B2 | 10/2018 | Amanullah |
| 10,100,602 | B2 | 10/2018 | McDonald et al. |
| 10,112,869 | B2 | 10/2018 | Agapiou |
| 10,113,389 | B2 | 10/2018 | Pandey et al. |
| 10,119,060 | B2 | 11/2018 | Pisklak et al. |
| 2004/0108113 | A1 | 6/2004 | Luke et al. |
| 2004/0188091 | A1 | 9/2004 | Luke et al. |
| 2007/0125272 | A1 | 6/2007 | Johnson |
| 2008/0028995 | A1* | 2/2008 | Barlet-Gouedard ... C09K 8/467 106/811 |
| 2008/0099202 | A1 | 5/2008 | Al-Dhafeeri et al. |
| 2011/0000400 | A1 | 1/2011 | Roddy |
| 2011/0094746 | A1 | 4/2011 | Allison et al. |
| 2012/0260829 | A1 | 10/2012 | Pershikova et al. |
| 2014/0069644 | A1 | 3/2014 | Reddy et al. |
| 2014/0158359 | A1 | 6/2014 | Davidson et al. |
| 2014/0353043 | A1 | 12/2014 | Amanullah et al. |
| 2015/0175481 | A1 | 6/2015 | Pisklak et al. |
| 2016/0046853 | A1 | 2/2016 | Chatterji et al. |
| 2016/0214901 | A1 | 7/2016 | Muthusamy et al. |
| 2016/0264842 | A1 | 9/2016 | Miller et al. |
| 2016/0348451 | A1 | 12/2016 | Amanullah |
| 2017/0001908 | A1 | 1/2017 | Agapiou |
| 2017/0137694 | A1 | 5/2017 | van Oort et al. |
| 2017/0183556 | A1 | 6/2017 | Agapiou et al. |
| 2017/0260819 | A1 | 9/2017 | Amanullah et al. |
| 2017/0298263 | A1 | 10/2017 | Amanullah |
| 2017/0334779 | A1 | 11/2017 | Gong et al. |
| 2019/0152853 | A1 | 5/2019 | Turcinskas et al. |
| 2020/0002594 | A1 | 1/2020 | Ray et al. |
| 2020/0131427 | A1 | 4/2020 | Alsaihati et al. |

FOREIGN PATENT DOCUMENTS

| | | | |
|---|---|---|---|
| CN | 105980514 A | | 9/2016 |
| GB | 1113205 A | | 5/1968 |
| GB | 2353523 A | | 2/2001 |
| JP | 2004067419 A | | 3/2004 |
| PL | 226104 B1 * | | 6/2017 |
| WO | 2012061187 A2 | | 5/2012 |
| WO | WO-2014081277 A1 * | 5/2014 | ............ C04B 28/26 |
| WO | 2016043712 A1 | | 3/2016 |
| WO | 2016043979 A1 | | 3/2016 |
| WO | 2016122530 A1 | | 8/2016 |
| WO | 2017174560 A1 | | 10/2017 |
| WO | 2020046734 A1 | | 3/2020 |

OTHER PUBLICATIONS

Djobo et al. "Volcanic ash-based geopolymer cements/concretes: the current state of the art and perspectives" Environmental Science and Pollution Research International, Ecomed, Landsberg, DE, vol. 24, No. 5, Dec. 15, 2016, pp. 4433-4446 (Year: 2016).*

Olawale (2013) Synthesism, characterization and binding strength of geopolymers: A review, International Journal of Materials Science and Applications. doi: 10.11648/j.ijmsa.20130206.14 (Year: 2013).*

Notice of Allowance and Fee(s) Due dated Jan. 22, 2021 pertaining to U.S. Appl. No. 16/822,651, filed Mar. 18, 2020, 5 pgs.

Ahdaya et al., "Investigating geopolymer cement performance in presence of water based drill fluid", Journal of Petroleum of Science and Engineering, vol. 176, pp. 934-942, Feb. 7, 2019.

Alp et al, "Utilization of Supplementary Cementitious Materials in Geothermal Well Cementing", Proceedings, Thirty-Eighth Workshop on Geothermal Reservoir Engineering, Stanford University, Stanford, California, Feb. 11-13, Feb. 11, 2013.

Al-Yami et al., "Chemical Additives for Oil Well Cementing", Research & Reviews: Journal of Chemistry, vol. 6, Issue 4, Oct. 20, 2017.

Hurley et al., Sodium Silicate Stabilization of Soils: A review of the literature, Chemical Stabilization on Foundations, pp. 46-79, 1972.

Liu et al., "Solidification of Synthetic-Based Drilling Mud Using Geopolymers", Society of Petroleum Engineers, SPE-180325-MS, Sep. 14, 2016.

Liu et al., "Geopolymer—Synthetic Based Mud Hybrid Cements for Primary Cementing and Lost Circulation Control", SPE-184558-MS, Apr. 3, 2017.

Petermann et al., Alkali-Activated Geopolymers: A Literature Review, Applied Research Associates, Inc. and Airbase Technologies Division, Air Force Research Laboratory, Feb. 6, 2012.

Piklowska et al., "Cement slurries used in drilling—types, properties, application", World Scientific News, vol. 76 pp. 149-165 Jun. 9, 2017.

Sugama, "Advanced Cements for Geothermal Wells", Brookhaven National Laboratory, Sustainable Energy Technologies Department, BNL-77901-2007-IR, Jul. 2006.

US Dept of Energy, "Learning from Roman Seater Concrete", Advanced Light Source Communications Group, 2016.

Office Action dated Jun. 22, 2020 pertaining to U.S. Appl. No. 16/822,645, filed Mar. 18, 2020, 26 pgs.

Office Action dated Jun. 23, 2020 pertaining to U.S. Appl. No. 16/822,651, filed Mar. 18, 2020, 29 pgs.

Office Action dated Oct. 8, 2020 pertaining to U.S. Appl. No. 16/822,651, filed Mar. 18, 2020, 11 pgs.

Notice of Allowance and Fee(s) Due dated Oct. 15, 2020 pertaining to U.S. Appl. No. 16/822,645, filed Mar. 18, 2020, 9 pgs.

International Search Report and Written Opinion dated Dec. 10, 2020 pertaining to International application No. PCT/US2020/050663 filed Sep. 14, 2020, 15 pgs.

Office Action dated Dec. 30, 2020 pertaining to U.S. Appl. No. 16/822,690, filed Mar. 18, 2020, 37 pgs.

International Search Report and Written Opinion dated Jan. 2, 2021 pertaining to International application No. PCT/US2020/052694 filed Sep. 25, 2020, 17 pgs.

Haddad, R. et al. "Production of geopolymer concrete using natural pozzolan: A parametric study" Construction and Building Materials, vol. 114, Apr. 6, 2016, pp. 699-707.

Tchakoute H.K. et al. "Utilization of volcanic ashes for the production of geopolymers cured at ambient temperature" Cement and Concrete Composites, vol. 38, Apr. 1, 2013, pp. 75-81.

Risdanareni P. et al. "The Influence of Alkali Activator Concentration to Mechanical Properties of Geopolymer Concrete with Trass as a Filler" Materials Science Forum, vol. 803, Aug. 1, 2014, pp. 125-134.

Djobo et al. "Volcanic ash-based geopolymer cements/concretes: the current state of the art and perspectives" Environmental Science and Pollution Research International, Ecomed, Landsberg, DE, vol. 24, No. 5, Dec. 15, 2016, pp. 4433-4446.

(56) References Cited

OTHER PUBLICATIONS

Cai G. et al. "Volcano-related materials in concretes: a comprehensive review" Environmental Science and Pollution Research International, Ecomed, Landsberg, DE, vol. 23, No. 8, Feb. 11, 2016, pp. 7220-7243.
Lemougna P. et al. "Review on the use of volcanic ashes for engineering applications" Resources, Conservation and Recycling, Elsevier, Amsterdam, NL, vol. 137, Jun. 19, 2018, pp. 177-190.
Office Action dated Nov. 24, 2020 pertaining to U.S. Appl. No. 16/822,672, filed Mar. 18, 2020, 34 pgs.
Leonelli et al., "Volcanic ash as alternative raw materials for traditional vitrified ceramic products," Advances in Applied Ceramics, vol. 106, p. 135-141; 2007. (Year: 2007).
Celik et al., "High-volume natural volcanic pozzolan and limestone powder as partial replacements for portland cement in self-compacting and sustainable concrete," Cement & Concrete Composites, vol. 45, p. 136-147; Sep. 18, 2013. (Year: 2013).
Khan et al., "Effect of Fineness of Basaltic Volcanic Ash on Pozzolanic Reactivity, ASR Expansion and Drying Shrinkage of Blended Cement Mortars," Materials, p. 1-21; Aug. 15, 2019. (Year: 2019).
Notice of Allowance and Fee(s) Due dated Mar. 18, 2021 pertaining to U.S. Appl. No. 16/822,672, filed Mar. 18, 2020, 29 pgs.
International Search Report and Written Opinion dated Jan. 25, 2021 pertaining to International application No. PCT/US2020/057346 filed Oct. 26, 2020, 16 pgs.
International Search Report and Written Opinion dated Jan. 25, 2021 pertaining to International application No. PCT/US2020/056825 filed Oct. 22, 2020, 16 pgs.
International Search Report and Written Opinion dated Jan. 19, 2021 pertaining to International application No. PCT/US2020/054200 filed Oct. 5, 2020, 16 pgs.
International Search Report and Written Opinion dated Jan. 27, 2021 pertaining to International application No. PCT/US2020/056820 filed Oct. 22, 2020, 17 pgs.
Notice of Allowance and Fee(s) Due dated Apr. 30, 2021 pertaining to U.S. Appl. No. 16/822,690, filed Mar. 18, 2020, 32 pgs.
Examination Report pertaining to Application No. GC2020-40861 dated Sep. 16, 2021, 5 pages.
U.S. Office Action dated Dec. 10, 2021 pertaining to U.S. Appl. No. 16/822,727, filed Mar. 18, 2020, 85 pages.

* cited by examiner

GEOPOLYMER CEMENT SLURRIES, CURED GEOPOLYMER CEMENT AND METHODS OF MAKING AND USE THEREOF

TECHNICAL FIELD

Embodiments of the present disclosure generally relate to geopolymer cement slurries and methods of making and using geopolymer cement slurries and to cured geopolymer cements and methods of making cured geopolymer cement.

BACKGROUND

Cement slurries are used in the oil and gas industries, such as for cementing in oil and gas wells. Primary, remedial, squeeze, and plug cementing techniques can be used, for instance, to place cement sheaths in an annulus between casing and well formations, for well repairs, well stability, and for well abandonment (sealing an old well to eliminate safety hazards). These cement slurries must be able to consistently perform over a wide range of temperatures and pressures, in the presence of certain corrosive chemical species, and under challenging mechanical conditions, as oil and gas wells can be located in a multitude of diverse locations. For example, a cement slurry may be used in conditions of less than 0° C. in freezing permafrost zones, and in temperatures exceeding 400° C. in geothermal wells and, as such, must be able to properly set under an assortment of conditions.

Proper placement of a cement slurry can be vital to wellbore isolation. However, conventional cement solutions may have a density greater than 170 pounds per cubic feet ($lb/ft^3$), and a yield point of less than 20 pounds force per 100 square feet ($lb/100\ ft^2$), leading to inconsistent flowability and creating concerns when handling or pumping the cement, as uniform placement of the slurry can be quite difficult. Moreover, cement slurries with a greater density increase the hydrostatic pressure that the cement column exerts on the wellbore, leading to poor isolation in weak zones that may break or crack under pressure. Cement slurries with a reduced density and increased yield point allow for more uniform flowability and more accurate and precise placement of the cement. Furthermore, cement slurries with a reduced density may be placed in a single stage, eliminating the need for multistage cementing tools.

SUMMARY

Accordingly, there is an ongoing need for cement slurries having a reduced density and an increased yield point. The present embodiments address these needs by providing geopolymer cement slurries and methods of making and using geopolymer cement slurries that include Saudi Arabian volcanic ash to serve as an extender to decrease the density and increase the yield point of the cement.

In one embodiment, a geopolymer cement slurry is provided, comprising an aqueous solution, Saudi Arabian volcanic ash, $Na_2SiO_3$, and NaOH. The Saudi Arabian volcanic ash comprises $SO_3$, CaO, $SiO_2$, $Al_2O_3$, $Fe_2O_3$, MgO, and $K_2O$.

Additional features and advantages of the described embodiments will be set forth in the detailed description which follows, and in part will be readily apparent to those skilled in the art from that description or recognized by practicing the described embodiments, including the detailed description which follows as well as the claims.

DETAILED DESCRIPTION

As used throughout this disclosure, the term "geopolymer cement slurry" refers to a composition comprising Saudi Arabian volcanic ash that is mixed with at least water to form cement. The geopolymer cement slurry may contain calcined alumina ($Al_2O_3$), silica ($SiO_2$), calcium oxide (CaO, also known as lime), iron oxide ($Fe_2O_3$), magnesium oxide (MgO), clay, sand, gravel, and mixtures thereof.

As used throughout this disclosure, the term "consistency" refers to a rheological property of matter related to the cohesion of the individual particles of a given material, its ability to deform and its resistance to flow. The consistency of geopolymer cement slurries is determined by thickening time tests in accordance with API Recommended Practice 10B and is expressed in Bearden units of consistency (Bc), a dimensionless quantity with no direction conversion factor to more common units of viscosity. The Bearden units of consistency is measured on a scale from 1 to 100 where, conventionally, difficult pumping is thought to begin at 50 Bc, and cement is completely set at 100 Bc.

As used throughout this disclosure, the term "curing" refers to providing adequate moisture, temperature and time to allow the concrete to achieve the desired properties (such as hardness) for its intended use through one or more reactions between the water and the Saudi Arabian volcanic ash.

As used throughout this disclosure, the term "drying" refers to merely allowing the cement to achieve a moisture condition appropriate for its intended use, which may only involve physical state changes, as opposed to chemical reactions.

As used throughout this disclosure, the term "extender" refers to a cement extender, that is, a chemical additive or inert material used to decrease the density of a geopolymer cement slurry and increase the yield point. Reducing the slurry density reduces the hydrostatic pressure of the cement column in the wellbore, leading to successful wellbore isolation.

As used throughout this disclosure, the term "free of" as used to describe any chemical or component refers to not including more than trace amounts of the chemical or component, where trace amounts refers to having less than 0.1% of the chemical or component.

As used throughout this disclosure, the term "kick" is used to describe a flow of formation fluids into the wellbore during drilling operations. The kick is physically caused by the pressure in the wellbore being less than that of the formation fluids, thus causing flow. This condition of lower wellbore pressure than the formation is caused in two ways. First, if the mud weight is too low, then the hydrostatic pressure exerted on the formation by the fluid column may be insufficient to hold the formation fluid in the formation. This can happen if the mud density is suddenly decreased or if a drilled formation has a higher pressure than anticipated. This type of kick might be called an underbalanced kick. The second way a kick can occur is if dynamic and transient fluid pressure effects, usually due to motion of the drillstring or casing, effectively lower the pressure in the wellbore below that of the formation. This second kick type could be called an induced kick.

As used throughout this disclosure, the term "plastic viscosity" refers to the slope of the shear stress/shear rate line greater than the yield point. Plastic viscosity represents the viscosity of a fluid when extrapolated to infinite shear rate. Plastic viscosity is increased by a viscous base fluid and by excess colloidal solids.

As used throughout this disclosure, the term "point of departure" refers to the beginning of thickening of a geopolymer cement slurry during the thickening-time test, and is often abbreviated as POD. For some geopolymer cement slurries, the POD is used as the thickening time.

As used throughout this disclosure, the term "retarder" refers to a chemical agent used to increase the thickening time of geopolymer cement slurries to enable proper placement. The need for cement retardation increases with depth due to the greater time required to complete the cementing operation and the effect of increased temperature on the cement-setting process.

As used throughout this disclosure, the term "Saudi Arabian volcanic ash" refers to volcanic ash originally acquired from Saudi Arabia.

As used throughout this disclosure, the term "shear stress" refers to the force per unit area required to sustain a constant rate of fluid movement.

As used throughout this disclosure, the term "shear rate" refers to the rate of change of velocity at which one layer of fluid passes over an adjacent layer.

As used throughout this disclosure, the term "subsurface formation" refers to a body of rock that is sufficiently distinctive and continuous from the surrounding rock bodies that the body of rock can be mapped as a distinct entity. A subsurface formation is, therefore, sufficiently homogenous to form a single identifiable unit containing similar rheological properties throughout the subsurface formation, including, but not limited to, porosity and permeability. A subsurface formation is the fundamental unit of lithostratigraphy.

As used throughout this disclosure, the term "thickening time" refers to a measurement of the time during which a geopolymer cement slurry remains in a fluid state and is capable of being pumped. Thickening time is assessed under downhole conditions using a pressurized consistometer that plots the viscosity of a slurry over time under the anticipated temperature and pressure conditions. The end of the thickening time is conventionally about 50 or 70 Bc.

As used throughout this disclosure, the term "wellbore" refers to the drilled hole or borehole, including the openhole or uncased portion of the well. Borehole may refer to the inside diameter of the wellbore wall, the rock face that bounds the drilled hole.

As used throughout this disclosure, the term "yield point" refers to the point in the stress-strain curve at which the curve levels off and plastic deformation begins to occur. Yield point is used to evaluate the void filling properties of cements and the ability of a cement to flow through the annulus. A greater yield point implies a non-Newtonian fluid, one that flows more uniformly than a fluid of similar density but lesser yield point. Yield point is increased by adding freshly dispersed clay or a flocculant, such as lime.

Embodiments of the present disclosure also relate to methods of producing and using geopolymer cement slurries, in some particular embodiments, for use in the oil and gas industries, such as for cementing in oil and gas wells. Oil and gas wells may be formed in subsurface formations. The wellbore may serve to connect natural resources, such as petrochemical products, to a ground level surface. In some embodiments, a wellbore may be formed in the subsurface formation, which may be formed by a drilling procedure. To drill a subterranean well or wellbore, a drill string including a drill bit and drill collars to weight the drill bit is inserted into a predrilled hole and rotated to cut into the rock at the bottom of the hole, producing rock cuttings. Commonly, drilling fluid may be utilized during the drilling process. To remove the rock cuttings from the bottom of the wellbore, drilling fluid is pumped down through the drill string to the drill bit. The drilling fluid cools the drill bit and lifts the rock cuttings away from the drill bit and carries the rock cuttings upwards as the drilling fluid is recirculated back to the surface.

In some instances, a casing may be inserted into the wellbore. The casing may be a pipe or other tubular structure which has a diameter less than that of the wellbore. Generally, the casing may be lowered into the wellbore such that the bottom of the casing reaches to a region near the bottom of the wellbore. In some embodiments, the casing may be cemented by inserting a cement slurry into the annulus region between the outer edge of the casing and the edge of the wellbore (the surface of the subsurface formation). The geopolymer cement slurry of the present disclosure may be inserted into the annular region by pumping the geopolymer cement slurry into the interior portion of the casing, to the bottom of the casing, around the bottom of the casing, into the annular region, or a combination of some or all of these. The geopolymer cement slurry may displace the drilling fluid, pushing it to the top of the well. In some embodiments, a spacer fluid may be used as a buffer between the geopolymer cement slurry and the drilling fluid by displacing and removing the drilling fluid before the geopolymer cement slurry is pumped into the well to prevent contact between the drilling fluid and the geopolymer cement slurry. Following the insertion of an appropriate amount of geopolymer cement slurry into the interior region of the casing, in some embodiments, a displacement fluid may be utilized to push the geopolymer cement slurry out of the interior region of the casing and into the annular region. This displacement may cause the entirety of the spacer fluid and drilling fluid to be removed from the annular region, out the top of the wellbore. The geopolymer cement slurry may then be cured or otherwise allowed to harden.

To ensure the stability and safety of a well, it is important that the geopolymer cement slurry properly harden into cured geopolymer cement. If the geopolymer cement slurry is not evenly placed or fluid is lost from the geopolymer cement slurry before curing, the geopolymer cement slurry may not evenly harden into a cured geopolymer cement. Therefore, the density, viscosity, flowability, and thickening time of a geopolymer cement slurry are important properties to ensure proper placement. Specifically, thickening time may be retarded by the use of retarder additives, creating more time for optimal placement of the cement before setting. Similarly, reducing fluid loss from the geopolymer cement slurry ensures uniform hardening, as curing often involves water-based reactions with the geopolymer cement slurry. Too much or too little water affects the hardness and, thus, the quality of the cured geopolymer cement produced.

A number of conditions may impact the fluid loss of a geopolymer cement slurry. For instance, water may be drawn from the slurry into the permeable subsurface formation, particularly if pumping ceases and the slurry becomes static without hardening. Water may also be lost due to displacement as the geopolymer cement slurry is passed through constrictions, such as the tight clearance between a casing and an annulus, which may "squeeze" water from the slurry. Adverse weather and soil conditions may additionally impact the amount of water present in the geopolymer cement slurry. As such, control of fluid loss of the geopolymer cement slurry may allow for a more uniform and stronger cured geopolymer cement.

To ensure the stability and safety of a well, it is important that the cured geopolymer cement maintains integrity and isolates the wellbore from the surrounding subsurface formations. If the cement cracks or degrades under cyclic stresses, wellbore integrity and isolation may be lost, resulting in undesirable fluid communication between the wellbore and surrounding subsurface formations. Not intending to be limited by theory, this fluid communication may result in drilling fluid loss from the wellbore into the surrounding subsurface formation, or in decreased wellbore pressure, possibly leading to a well control event. Therefore, wellbore integrity and isolation are critical to efficient production and use of a wellbore.

The present disclosure provides methods of making geopolymer cement slurries which may have, among other attributes, reduced density, increased yield point, improved mechanical properties, and increased resistance to $H_2S$ to address these concerns. The method of making the geopolymer cement slurry of the present disclosure includes mixing Saudi Arabian volcanic ash, and an aqueous solution to form the geopolymer cement slurry, in which the Saudi Arabian volcanic ash comprises $SO_3$, $CaO$, $SiO_2$, $Al_2O_3$, $Fe_2O_3$, $MgO$, and $K_2O$ and the geopolymer cement slurry is free of any other $SiO_2$ additive. Without being bound by any particular theory, use of Saudi Arabian volcanic ash may provide the cured geopolymer cement with increased yield point, reduced density, improved mechanical properties, and increased resistance to $H_2S$ of the geopolymer cement slurry.

The mixing step, in some embodiments, may involve shearing the aqueous solution, and Saudi Arabian volcanic ash and, optionally, other additives at a suitable speed for a suitable period of time to form the geopolymer cement slurry. In one embodiment, the mixing may be done in the lab using a standard API blender for 15 seconds at 4,000 revolutions per minute (rpm) and 35 seconds at 12,000 rpm. The equation of mixing energy is:

$$\frac{E}{M} = \frac{k\omega^2 t}{V} \qquad \text{(Equation 1)}$$

Where
E=Mixing energy (kiloJoules (kJ))
M=Mass of slurry (kilograms (kg))
k=6.1×10$^{-8}$ m$^5$/s (constant found experimentally)
ω=Rotational speed (radians/second (s$^{-1}$))
t=Mixing time (s)
V=Slurry volume (m$^3$)

An aqueous solution may be added to the Saudi Arabian volcanic ash to produce the slurry. The aqueous solution may include one or more than one of deionized water, tap water, fresh water, salt water, natural or synthetic brine, municipal water, formation water, produced water, well water, filtered water, distilled water, sea water, other types of water, or combinations of waters. In some embodiments, the aqueous solution may include water or a solution containing water and one or more inorganic compounds dissolved in the water or otherwise completely miscible with the water. In some embodiments, the aqueous solution may contain brine, including natural and synthetic brine. In some embodiments, salt or other organic compounds may be incorporated into the aqueous solution to control certain properties of the water, and thus the geopolymer cement slurry, such as density. Without being bound by any particular theory, increasing the saturation of the aqueous solution by increasing the salt concentration or the level of other organic compounds in the water may increase the density of the water, and thus, the geopolymer cement slurry. Suitable salts may include, but are not limited to, alkali metal chlorides, hydroxides, or carboxylates. In some embodiments, suitable salts may include sodium, calcium, cesium, zinc, aluminum, magnesium, potassium, strontium, silicon, lithium, chlorides, bromides, carbonates, iodides, chlorates, bromates, formates, nitrates, sulfates, phosphates, oxides, fluorides, and combinations of these.

In some embodiments, the geopolymer cement slurry may contain from 10 to 70 weight percent (wt. %) by weight of volcanic ash (BWOV) aqueous solution. In some embodiments, the geopolymer cement slurry may contain from 10 to 40 wt. %, from 10 to 30 wt. %, from 10 to 20 wt. %, from 20 to 40 wt. %, from 25 to 35 wt. %, or from 20 to 30 wt. % BWOV water. The geopolymer cement slurry may contain 30 wt. % BWOV aqueous solution.

Along with the aqueous solution, the geopolymer cement slurry includes Saudi Arabian volcanic ash. The Saudi Arabian volcanic ash functions as an extender, reducing the density of the geopolymer cement slurry and increasing the yield point of the geopolymer cement slurry. In embodiments, the geopolymer cement slurry may include from 30 to 70 wt. %, from 30 to 65 wt. %, from 30 to 60 wt. %, from 30 to 55 wt. %, from 30 to 50 wt. %, from 30 to 45 wt. %, from 30 to 40 wt. %, from 30 to 35 wt. %, from 35 to 70 wt. %, from 35 to 65 wt. %, from 35 to 60 wt. %, from 35 to 55 wt. %, from 35 to 50 wt. %, from 35 to 45 wt. %, from 35 to 40 wt. %, from 40 to 70 wt. %, from 40 to 65 wt. %, from 40 to 60 wt. %, from 40 to 55 wt. %, from 40 to 50 wt. %, from 40 to 45 wt. %, from 45 to 70 wt. %, from 45 to 65 wt. %, from 45 to 60 wt. %, from 45 to 55 wt. %, from 45 to 50 wt. %, from 50 to 70 wt. %, from 50 to 65 wt. %, from 50 to 60 wt. %, from 50 to 55 wt. %, from 55 to 70 wt. %, from 55 to 65 wt. %, from 55 to 60 wt. %, from 60 to 70 wt. %, from 60 to 65 wt. %, or from 65 to 70 wt. % Saudi Arabian volcanic ash by weight of the geopolymer cement slurry.

The Saudi Arabian volcanic ash may have a particle size of from 20 to 30 microns. The Saudi Arabian volcanic ash is free of $TiO_2$. The Saudi Arabian volcanic ash may comprise from 0.05 to 2 wt. %, from 0.05 to 1 wt. %, from 0.05 to 0.8 wt. %, from 0.05 to 0.5 wt. %, from 0.05 to 0.2 wt. %, from 0.05 to 0.15 wt. %, from 0.05 to 0.1 wt. %, from 0.1 to 2 wt. %, from 0.1 to 1 wt. %, from 0.1 to 0.8 wt. %, from 0.1 to 0.5 wt. %, from 0.1 to 0.2 wt. %, from 0.1 to 0.15 wt. %, from 0.15 to 2 wt. %, from 0.15 to 1 wt. %, from 0.15 to 0.8 wt. %, from 0.15 to 0.5 wt. %, from 0.15 to 0.2 wt. %, from 0.2 to 2 wt. %, from 0.2 to 1 wt. %, from 0.2 to 0.8 wt. %, or from 0.2 to 0.5 wt. % $SO_3$. More specifically, the Saudi Arabian volcanic ash may comprise from 0.05 to 0.2 wt. % $SO_3$, from 5 to 10 wt. % $CaO$, from 40 to 50 wt. % $SiO_2$, from 10 to 20 wt. % $Al_2O_3$, from 10 to 15 wt. % $Fe_2O_3$, from 5 to 10 wt. % $MgO$, and from 0.5 to 5 wt. % $K_2O$. The geopolymer cement slurry may include from 2 to 80 wt. % BWOV, from 5 to 80 wt. % BWOV, from 8 to 80 wt. % BWOV, from 15 to 80 wt. % BWOV, from 25 to 80 wt. % BWOV, from 40 to 80 wt. % BWOV, from 50 to 80 wt. % BWOV, from 60 to 80 wt. % BWOV, from 2 to 60 wt. % BWOV, from 5 to 60 wt. % BWOV, from 8 to 60 wt. % BWOV, from 15 to 60 wt. % BWOV, from 25 to 60 wt. % BWOV, from 40 to 60 wt. % BWOV, from 50 to 60 wt. % BWOV, from 2 to 50 wt. % BWOV, from 5 to 50 wt. % BWOV, from 8 to 50 wt. % BWOV, from 15 to 50 wt. % BWOV, from 25 to 50 wt. % BWOV, from 40 to 50 wt. % BWOV, from 2 to 40 wt. % BWOV, from 5 to 40 wt. %

BWOV, from 8 to 40 wt. % BWOV, from 15 to 40 wt. % BWOV, from 25 to 40 wt. % BWOV, from 2 to 25 wt. % BWOV, from 5 to 25 wt. % BWOV, from 8 to 25 wt. % BWOV, from 15 to 25 wt. % BWOV, from 2 to 15 wt. % BWOV, from 5 to 15 wt. % BWOV, from 8 to 15 wt. % BWOV, from 2 to 8 wt. % BWOV, or from 5 to 8 wt. % BWOV Saudi Arabian volcanic ash.

The Saudi Arabian volcanic ash may comprise from 2 to 25 wt. %, from 2 to 20 wt. %, from 2 to 15 wt. %, from 2 to 10 wt. %, from 2 to 8 wt. %, from 2 to 5 wt. %, from 5 to 25 wt. %, from 5 to 20 wt. %, from 5 to 15 wt. %, from 5 to 10 wt. %, from 5 to 8 wt. %, from 8 to 25 wt. %, from 8 to 20 wt. %, from 8 to 15 wt. %, from 8 to 10 wt. %, from 10 to 25 wt. %, from 10 to 20 wt. %, or from 10 to 15 wt. % CaO. The Saudi Arabian volcanic ash may comprise from 30 to 70 wt. %, from 30 to 60 wt. %, from 30 to 55 wt. %, from 30 to 50 wt. %, from 30 to 45 wt. %, from 30 to 40 wt. %, from 35 to 70 wt. %, from 35 to 60 wt. %, from 35 to 55 wt. %, from 35 to 50 wt. %, from 35 to 45 wt. %, from 35 to 40 wt. %, from 40 to 70 wt. %, from 40 to 60 wt. %, from 40 to 55 wt. %, from 40 to 50 wt. %, from 40 to 45 wt. %, from 45 to 70 wt. %, from 45 to 60 wt. %, from 45 to 55 wt. %, from 45 to 50 wt. %, from 50 to 70 wt. %, from 50 to 60 wt. %, or from 50 to 55 wt. % $SiO_2$. The Saudi Arabian volcanic ash may comprise from 2 to 40 wt. %, from 2 to 35 wt. %, from 2 to 30 wt. %, from 2 to 25 wt. %, from 2 to 20 wt. %, from 2 to 15 wt. %, from 2 to 10 wt. %, from 2 to 5 wt. %, from 5 to 40 wt. %, from 5 to 35 wt. %, from 5 to 30 wt. %, from 5 to 25 wt. %, from 5 to 20 wt. %, from 5 to 15 wt. %, from 5 to 10 wt. %, from 10 to 40 wt. %, from 10 to 35 wt. %, from 10 to 30 wt. %, from 10 to 25 wt. %, from 10 to 20 wt. %, from 10 to 15 wt. %, from 15 to 40 wt. %, from 15 to 35 wt. %, from 15 to 30 wt. %, from 15 to 25 wt. %, from 15 to 20 wt. %, from 20 to 40 wt. %, from 20 to 35 wt. %, from 20 to 30 wt. %, from 20 to 25 wt. % $Al_2O_3$. The Saudi Arabian volcanic ash may comprise from 2 to 30 wt. %, from 2 to 25 wt. %, from 2 to 20 wt. %, from 2 to 15 wt. %, from 2 to 13 wt. %, from 2 to 10 wt. %, from 2 to 8 wt. %, from 2 to 5 wt. %, from 5 to 30 wt. %, from 5 to 25 wt. %, from 5 to 20 wt. %, from 5 to 15 wt. %, from 5 to 13 wt. %, from 5 to 10 wt. %, from 5 to 8 wt. %, from 8 to 30 wt. %, from 8 to 25 wt. %, from 8 to 20 wt. %, from 8 to 15 wt. %, from 8 to 13 wt. %, from 8 to 10 wt. %, from 10 to 30 wt. %, from 10 to 25 wt. %, from 10 to 20 wt. %, from 10 to 15 wt. %, from 10 to 13 wt. %, from 13 to 30 wt. %, from 13 to 25 wt. %, from 13 to 20 wt. %, from 13 to 15 wt. %, from 15 to 30 wt. %, from 15 to 25 wt. %, or from 15 to 20 wt. % $Fe_2O_3$. The Saudi Arabian volcanic ash may comprise from 2 to 25 wt. %, from 2 to 20 wt. %, from 2 to 15 wt. %, from 2 to 10 wt. %, from 2 to 8 wt. %, from 2 to 5 wt. %, from 5 to 25 wt. %, from 5 to 20 wt. %, from 5 to 15 wt. %, from 5 to 10 wt. %, from 5 to 8 wt. %, from 8 to 25 wt. %, from 8 to 20 wt. %, from 8 to 15 wt. %, from 8 to 10 wt. %, from 10 to 25 wt. %, from 10 to 20 wt. %, or from 10 to 15 wt. % MgO. The Saudi Arabian volcanic ash may comprise from 0.2 to 10 wt. %, from 0.2 to 7 wt. %, from 0.2 to 5 wt. %, from 0.2 to 3 wt. %, from 0.2 to 2 wt. %, from 0.2 to 1 wt. %, from 0.2 to 0.5 wt. %, from 0.5 to 10 wt. %, from 0.5 to 7 wt. %, from 0.5 to 5 wt. %, from 0.5 to 3 wt. %, from 0.5 to 2 wt. %, from 0.5 to 1 wt. %, from 1 to 10 wt. %, from 1 to 7 wt. %, from 1 to 5 wt. %, from 1 to 3 wt. %, from 1 to 2 wt. %, from 2 to 10 wt. %, from 2 to 7 wt. %, from 2 to 5 wt. %, from 1 to 3 wt. %, from 3 to 10 wt. %, from 3 to 7 wt. %, from 3 to 5 wt. %, from 5 to 10 wt. %, or from 5 to 7 wt. % $K_2O$.

Along with the aqueous solution and Saudi Arabian volcanic ash, the geopolymer cement slurry includes sodium silicate ($Na_2SiO_3$). The geopolymer cement slurry may include from 25 to 50 wt. %, from 25 to 45 wt. %, from 25 to 40 wt. %, from 25 to 35 wt. %, from 25 to 30 wt. %, from 30 to 50 wt. %, from 30 to 45 wt. %, from 30 to 40 wt. %, from 30 to 35 wt. %, from 35 to 50 wt. %, from 35 to 45 wt. %, from 35 to 40 wt. %, from 40 to 50 wt. %, from 40 to 45 wt. %, or from 45 to 50 wt. % $Na_2SiO_3$. The $Na_2SiO_3$ may have a ratio of $Na_2O$ to $SiO_2$ of from 0.250:1 to 0.350:1, from 0.250:1 to 0.330:1, from 0.250:1 to 0.300:1, from 0.250:1 to 0.270:1, from 0.270:1 to 0.350:1, from 0.270:1 to 0.330:1, from 0.270:1 to 0.300:1, from 0.300:1 to 0.350:1, from 0.300:1 to 0.330:1, or from 0.330:1 to 0.350:1.

Along with the aqueous solution and Saudi Arabian volcanic ash, the geopolymer cement slurry includes sodium hydroxide (NaOH). The geopolymer cement slurry may include from 15 to 35 wt. %, from 15 to 30 wt. %, from 15 to 25 wt. %, from 15 to 20 wt. %, from 20 to 35 wt. %, from 20 to 30 wt. %, from 20 to 25 wt. %, from 25 to 35 wt. %, from 25 to 30 wt. %, or from 30 to 35 wt. % NaOH.

The geopolymer cement slurry may have a pH of greater than 7. In embodiments, the geopolymer cement slurry may have a pH of from 8 to 14, from 9 to 13, from 10 to 13, from 11 to 13, from 11.5 to 13.0, from 11.6 to 13.0, from 11.6 to 12.5, or from 11.6 to 12.0.

In embodiments, the geopolymer cement slurry may include a sodium aluminosilicate hydrate. This sodium aluminosilicate hydrate may be a reaction product of the Saudi Arabian volcanic ash, $Na_2SiO_3$, and NaOH. Specifically, a polycondensation of silicate and aluminate monomers (from the Saudi Arabian volcanic ash) under alkaline conditions (due to the addition of NaOH and $Na_2SiO_3$) may occur, forming the sodium aluminosilicate hydrate. In preparing the geopolymer cement slurry, it was expected to be desirable to have approximately a 1.0:1.0 molar ratio of $Na_2O$ combined with NaOH to aluminate ($Al_2O_3$). It was contemplated that this may balance the negative charge on the Al atom with the sodium ions in the sodium aluminosilicate hydrate structure. However, after preparing a geopolymer cement slurry with a molar ratio of $Na_2O$ and NaOH to $Al_2O_3$ of 0.97:1.0, the resulting geopolymer cement slurry had an undesirably quick gelation time that would make well cementing difficult. To address this unexpected outcome, the ratio of $Na_2O$ and NaOH to $Al_2O_3$ in the geopolymer cement slurry of the present disclosure may range from 0.30:1.00 to 0.90:1.00, from 0.30:1.00 to 0.80:1.00, from 0.30:1.00 to 0.75:1.00, from 0.30:1.00 to 0.70:1.00, from 0.30:1.00 to 0.65:1.00, from 0.30:1.00 to 0.60:1.00, from 0.30:1.00 to 0.55:1.00, from 0.30:1.00 to 0.50:1.00, from 0.30:1.00 to 0.40:1.00, from 0.40:1.00 to 0.90:1.00, from 0.40:1.00 to 0.80:1.00, from 0.40:1.00 to 0.75:1.00, from 0.40:1.00 to 0.70:1.00, from 0.40:1.00 to 0.65:1.00, from 0.40:1.00 to 0.60:1.00, from 0.40:1.00 to 0.55:1.00, from 0.40:1.00 to 0.50:1.00, from 0.50:1.00 to 0.90:1.00, from 0.50:1.00 to 0.80:1.00, from 0.50:1.00 to 0.75:1.00, from 0.50:1.00 to 0.70:1.00, from 0.50:1.00 to 0.65:1.00, from 0.50:1.00 to 0.60:1.00, from 0.50:1.00 to 0.55:1.00, from 0.55:1.00 to 0.90:1.00, from 0.55:1.00 to 0.80:1.00, from 0.55:1.00 to 0.75:1.00, from 0.55:1.00 to 0.70:1.00, from 0.55:1.00 to 0.65:1.00, from 0.55:1.00 to 0.60:1.00, from 0.60:1.00 to 0.90:1.00, from 0.60:1.00 to 0.80:1.00, from 0.60:1.00 to 0.75:1.00, from 0.60:1.00 to 0.70:1.00, from 0.60:1.00 to 0.65:1.00, from 0.65:1.00 to 0.90:1.00, from 0.65:1.00 to 0.80:1.00, from 0.65:1.00 to 0.75:1.00, from 0.65:1.00 to 0.70:1.00, from 0.70:1.00 to 0.90:1.00, from 0.70:1.00 to 0.80:1.00, from 0.70:1.00 to 0.75:1.00, from 0.75:1.00 to 0.90:1.00, from 0.75:1.00 to 0.80:1.00, or from 0.80:1.00 to 0.90:1.00.

In embodiments, the ratio of $Na_2SiO_3$ combined with NaOH to $Al_2O_3$ may range from 0.5:1.0 to 9.0:1.0, from 0.5:1.0 to 7.0:1.0, from 0.5:1.0 to 5.0:1.0, from 0.5:1.0 to 3.0:1.0, from 0.5:1.0 to 2.0:1.0, from 0.5:1.0 to 1.5:1.0, from 0.5:1.0 to 1.0:1.0, from 1.0:1.0 to 9.0:1.0, from 1.0:1.0 to 7.0:1.0, from 1.0:1.0 to 5.0:1.0, from 1.0:1.0 to 3.0:1.0, from 1.0:1.0 to 2.0:1.0, from 1.0:1.0 to 1.5:1.0, from 1.5:1.0 to 9.0:1.0, from 1.5:1.0 to 7.0:1.0, from 1.5:1.0 to 5.0:1.0, from 1.5:1.0 to 3.0:1.0, from 1.5:1.0 to 2.0:1.0, from 2.0:1.0 to 9.0:1.0, from 2.0:1.0 to 7.0:1.0, from 2.0:1.0 to 5.0:1.0, from 2.0:1.0 to 3.0:1.0, from 3.0:1.0 to 9.0:1.0, from 3.0:1.0 to 7.0:1.0, from 3.0:1.0 to 5.0:1.0, from 5.0:1.0 to 9.0:1.0, from 5.0:1.0 to 7.0:1.0, or from 7.0:1.0 to 9.0:1.0.

The sodium aluminosilicate hydrate may have a formula of $Na_n[(-SiO_2)_z-AlO_2]_n \cdot yH_2O$, where n represents a degree of polymerization ranging from 1 to 50, from 1 to 40, from 1 to 30, from 1 to 25, from 1 to 20, from 1 to 15, from 1 to 10, from 1 to 5, from 5 to 50, from 5 to 40, from 5 to 30, from 5 to 25, from 5 to 20, from 5 to 15, from 5 to 10, from 10 to 50, from 10 to 40, from 10 to 30, from 10 to 25, from 10 to 20, from 10 to 15, from 15 to 50, from 15 to 40, from 15 to 30, from 15 to 25, from 15 to 20, from 20 to 50, from 20 to 40, from 20 to 30, from 20 to 25, from 25 to 50, from 25 to 40, from 25 to 30, from 30 to 50, from 30 to 40, or from 40 to 50, and z represents an amount of silicate ranging from 2 to 10, from 2 to 8, from 2 to 6, from 2 to 5, from 2 to 4, from 4 to 10, from 4 to 8, from 4 to 6, from 4 to 5, from 5 to 10, from 5 to 8, from 5 to 6, from 6 to 10, from 6 to 8, or from 8 to 10. The sodium aluminosilicate hydrate may have a structure as shown in Structure 1:

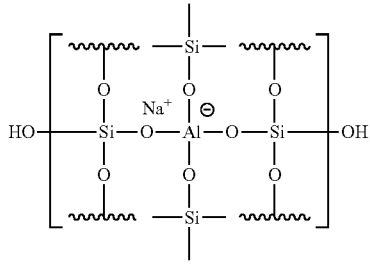

Structure 1

The sodium aluminosilicate hydrate may have a compressive strength of from 500 to 5000 psi, from 500 to 3000 psi, from 500 to 2600 psi, from 500 to 2200 psi, from 500 to 2000 psi, from 500 to 1500 psi, from 500 to 1000 psi, from 1000 to 5000 psi, from 1000 to 3000 psi, from 1000 to 2600 psi, from 1000 to 2200 psi, from 1000 to 2000 psi, from 1000 to 1500 psi, from 1500 to 5000 psi, from 1500 to 3000 psi, from 1500 to 2600 psi, from 1500 to 2200 psi, from 1500 to 2000 psi, from 2000 to 5000 psi, from 2000 to 3000 psi, from 2000 to 2600 psi, from 2000 to 2200 psi, from 2200 to 5000 psi, from 2200 to 3000 psi, from 2200 to 2600 psi, from 2600 to 5000 psi, from 2600 to 3000 psi, or from 3000 to 5000 psi.

In some embodiments the geopolymer cement slurry may contain a cement precursor material. The cement precursor material may be any suitable material which, when mixed with water, can be cured into a cement. The cement precursor material may be hydraulic or non-hydraulic. A hydraulic cement precursor refers to a mixture of limestone, clay and gypsum burned together under temperatures greater than 1000° C. that may begin to harden instantly or within a few minutes while in contact with water. A non-hydraulic cement precursor material refers to a mixture of lime, gypsum, plasters and oxychloride. A non-hydraulic cement precursor may take longer to harden or may require drying conditions for proper strengthening, but often is more economically feasible. A hydraulic or non-hydraulic cement precursor material may be chosen based on the desired application of the geopolymer cement slurry of the present disclosure. In some embodiments, the cement precursor material may be Portland cement precursor, for example, Class G Portland Cement. Portland cement precursor is a hydraulic cement precursor (cement precursor material that not only hardens by reacting with water but also forms a water-resistant product) produced by pulverizing clinkers, which contain hydraulic calcium silicates and one or more of the forms of calcium sulfate as an inter-ground addition. In other embodiments, the cement precursor material may be Saudi cement precursor, a combination of Portland cement precursor and crystalline silica, also known as quartz.

The cement precursor material may include one or more of calcium hydroxide, silicates, oxides, belite ($Ca_2SiO_5$), alite ($Ca_3SiO_4$), tricalcium aluminate ($Ca_3Al_2O_6$), tetracalcium aluminoferrite ($Ca_4Al_2Fe_2O_{10}$), brownmilleriate ($4CaO \cdot Al_2O_3 \cdot Fe_2O_3$), gypsum ($CaSO_4 \cdot 2H_2O$) sodium oxide, potassium oxide, limestone, lime (calcium oxide), hexavalent chromium, trivalent chromium, calcium aluminate, silica sand, silica flour, hematite, manganese tetroxide, other similar compounds, and combinations of these. The cement precursor material may include Portland cement, siliceous fly ash, calcareous fly ash, slag cement, silica fume, quartz, any known cement precursor material or combinations of any of these. Silica flour is a finely ground crystalline silica with a molecular formula of $SiO_2$ and with a grain size ranging from 1 to 500 microns, from 10 to 500 microns, from 10 to 100 microns, from 10 to 80 microns, from 10 to 50 microns, from 10 to 20 microns, from 20 to 100 microns, from 20 to 80 microns, from 20 to 50 microns, from 50 to 100 microns, from 50 to 80 microns, or from 80 to 100 microns.

The geopolymer cement slurry may include Saudi Class G cement. Saudi Class G cement may include from 60 to 100 wt. %, from 60 to 99 wt. %, from 60 to 98 wt. %, from 60 to 97 wt. %, from 60 to 96 wt. %, from 60 to 95 wt. %, from 60 to 90 wt. %, from 60 to 80 wt. %, from 60 to 70 wt. %, from 70 to 100 wt. %, from 70 to 99 wt. %, from 70 to 98 wt. %, from 70 to 97 wt. %, from 70 to 96 wt. %, from 70 to 95 wt. %, from 70 to 90 wt. %, from 70 to 80 wt. %, from 80 to 100 wt. %, from 80 to 99 wt. %, from 80 to 98 wt. %, from 80 to 97 wt. %, from 80 to 96 wt. %, from 80 to 95 wt. %, from 80 to 90 wt. %, from 90 to 100 wt. %, from 90 to 99 wt. %, from 90 to 98 wt. %, from 90 to 97 wt. %, from 90 to 96 wt. %, from 90 to 95 wt. %, from 95 to 100 wt. %, from 95 to 99 wt. %, from 95 to 98 wt. %, from 95 to 97 wt. %, from 95 to 96 wt. %, from 96 to 100 wt. %, from 96 to 99 wt. %, from 96 to 98 wt. %, from 96 to 97 wt. %, from 97 to 100 wt. %, from 97 to 99 wt. %, from 97 to 98 wt. %, from 98 to 100 wt. %, from 98 to 99 wt. %, or from 99 to 100 Portland cement. Saudi Class G cement may include less than 40 wt. %, less than 30 wt. %, less than 20 wt. %, less than 10 wt. %, less than 5 wt. %, less than 4 wt. %, less than 3 wt. %, less than 2 wt. %, or less than 1 wt. % crystalline silica, or quartz. Saudi Class G cement may have a pH of greater than 7, of from 8 to 14, of from 10 to 13, of from 11 to 13, of from 12 to 13, or of 12.4. Saudi Class G cement may have a bulk density at 20° C. of from 70 to 120 $lb/ft^3$, of from 80 to 110 $lb/ft^3$, of from 90 to 100 $lb/ft^3$, or of 94 $lb/ft^3$. Saudi Class G cement may have a solubility in water of from 0.1 to 2 grams per 100 milliliters (g/100 ml), of from 0.1 to 1 g/100 ml, of from 0.1 to 0.8 g/100 ml, of from 0.1 to 0.5 g/100 ml, of from 0.2 to 2 g/100 ml, of from 0.2 to 1 g/100 ml, of from 0.2 to 0.8 g/100 ml, of from 0.2 to 0.5 g/100 ml, of from 0.4 to 2 g/100 ml, of from 0.4 to 1 g/100 ml, of from 0.4 to 0.8 g/100 ml, of from 0.4 to 0.5 g/100 ml, of from 0.5 to 2 g/100 ml, of from 0.5 to 1 g/100 ml, of from 0.5 to 0.8 g/100 ml, or of 0.5 g/100 ml.

In some embodiments, the geopolymer cement slurry may contain at least one additive other than Saudi Arabian volcanic ash. The one or more additives may be any additives known to be suitable for geopolymer cement slurries. As non-limiting examples, suitable additives may include accelerators, retarders, extenders, weighting agents, fluid loss control agents, lost circulation control agents, surfactants, antifoaming agents, specialty additives such as elastomers or fibers, and combinations of these.

In some embodiments, the geopolymer cement slurry may contain from 0.1 to 10 wt. % BWOV of the one or more additives based on the total weight of the geopolymer cement slurry. For instance, the geopolymer cement slurry may contain from 0.1 to 8 wt. % BWOV of the one or more additives, from 0.1 to 5 wt. % BWOV of the one or more additives, or from 0.1 to 3 wt. % BWOV of the one or more additives. The geopolymer cement slurry may contain from 1 to 10 wt. % BWOV of the one or more additives, from 1 to 8 wt. % BWOV, from 1 to 5 wt. % BWOV, or from 1 to 3 wt. % BWOV of the one or more additives. In some embodiments, the geopolymer cement slurry may contain from 3 to 5 wt. % BWOV, from 3 to 8 wt. % BWOV, from 3 to 10 wt. % BWOV, or from 5 to 10 wt. % BWOV of the one or more additives.

In some embodiments, the one or more additives may include a dispersant containing one or more anionic groups. For instance, the dispersant may include synthetic sulfonated polymers, lignosulfonates with carboxylate groups, organic acids, hydroxylated sugars, other anionic groups, or combinations of any of these. Without being bound by any particular theory, in some embodiments, the anionic groups on the dispersant may be adsorbed on the surface of the cement particles to impart a negative charge to the geopolymer cement slurry. The electrostatic repulsion of the negatively charged cement particles may allow the geopolymer cement slurry to be dispersed and more fluid-like, improving flowability. This may allow for one or more of turbulence at lesser pump rates, reduction of friction pressure when pumping, reduction of water content, and improvement of the performance of fluid loss additives.

In some embodiments, the one or more additives may alternatively or additionally include a fluid loss additive. In some embodiments, the cement fluid loss additive may include non-ionic cellulose derivatives. In some embodiments, the cement fluid loss additive may be hydroxyethylcellulose (HEC). In other embodiments, the fluid loss additive may be a non-ionic synthetic polymer (for example, polyvinyl alcohol or polyethyleneimine). In some embodiments, the fluid loss additive may include bentonite, which may additionally viscosify the geopolymer cement slurry and may, in some embodiments, cause additional retardation effects.

In some embodiments, the geopolymer cement slurry may contain from 0.1 to 10 wt. % BWOV of one or more fluid loss additives, the one or more dispersants, or both. The geopolymer cement slurry may contain from 0.02 to 90 pound per barrel (lb/bbl) of the fluid loss additives, the one or more dispersants, or both based on the total weight of the geopolymer cement slurry. For instance, the geopolymer cement slurry may contain from 0.1 to 90 lb/bbl, from 0.1 to 75 lb/bbl, from 0.1 to 50 lb/bbl, from 1 to 90 lb/bbl, from 1 to 50 lb/bbl, from 5 to 90 lb/bbl, or from 5 to 50 lb/bbl of the fluid loss additives, the one or more dispersants, or both.

The geopolymer cement slurry may have a thickening time at 100° F. of greater than 1, 2, 5, 10, or 12 hours. A thickening time test is used to simulate pumping conditions in order to determine a length of time before the cement becomes difficult or impossible to pump. The most common method to determine thickening time is via a pressurized consistometer. This device allows pressure and temperature to be applied to a geopolymer cement slurry while it is being stirred (typically at 150 rpm). A resistor arm on a potentiometer indicates resistance to the paddle turning as the cement sets. The apparatus is calibrated to a standard output in Bearden Consistency units. The device is fully automated and can simulate squeeze schedules and/or batch mixing, etc.

The geopolymer cement slurry may have a density of from 100 to 140 lb/ft$^3$. In other embodiments, the geopolymer cement slurry may have a density of from 100 to 130 lb/ft$^3$, from 100 to 120 lb/ft$^3$, from 100 to 115 lb/ft$^3$, from 100 to 110 lb/ft$^3$, from 100 to 105 lb/ft$^3$, from 105 to 140 lb/ft$^3$, from 105 to 130 lb/ft$^3$, from 105 to 120 lb/ft$^3$, from 105 to 115 lb/ft$^3$, from 105 to 110 lb/ft$^3$, from 110 to 140 lb/ft$^3$, from 110 to 130 lb/ft$^3$, from 110 to 120 lb/ft$^3$, from 110 to 115 lb/ft$^3$, from 115 to 140 lb/ft$^3$, from 115 to 130 lb/ft$^3$, from 115 to 120 lb/ft$^3$, from 120 to 140 lb/ft$^3$, from 120 to 130 lb/ft$^3$, or from 130 to 140 lb/ft$^3$.

The viscosity of the geopolymer cement slurry compositions may be measured using a standard oilfield viscometer, such as a FANN® Model 35 viscometer manufactured by Fann Instrument Company for example, according to test methods provided in the API Recommended Practice For Field Testing Water-Based Geopolymer cement slurries (RP 13B-1/ISO 10414-1:2002). The viscometer reports shear stress readings at various shear rates. The shear stress readings are reported in units of pounds of force per 100 square feet (lbf/100 ft$^2$). The shear rate is measured in rpm. The viscometer may report shear stress readings at shear rates of at least one of 600 rpm, 300 rpm, 200 rpm, 100 rpm, 6 rpm, or 3 rpm. These shear stress readings may be used to determine the viscosity of the geopolymer cement slurry at any of the shear rates, using Equation 2, assuming a viscometer with an R1 rotor sleeve, B1 bob, and F1 torsion spring:

$$\mu = \frac{300}{N}\theta_N \qquad \text{Equation 2}$$

Where
$\mu$=viscosity, (cp)
$N$=viscometer speed, shear rate (rpm)
$\theta_N$=viscometer reading, shear stress (lbf/100 ft$^2$)

The rheology of geopolymer cement slurry compositions may be modeled based on Bingham plastic flow behavior. In particular, the geopolymer cement slurry composition having Saudi Arabian volcanic ash behaves as a rigid body at lesser shear stress but flows as a viscous fluid at greater shear stress. The rheological behavior of the geopolymer cement slurry composition may be determined by measuring the shear stress on the geopolymer cement slurry composition at different shear rates, which may be accomplished by measuring the shear stress and/or shear rate on the geopolymer cement slurry composition using a FANN® Model 35 viscometer operated at 3 rpm, 6 rpm, 100 rpm, 200 rpm, 300 rpm, or 600 rpm, for example. A Bingham plastic fluid may be modeled by Equation 3.

$$\tau = (PV)\dot{\gamma} + 4.79 YP \qquad \text{Equation 3}$$

Where
τ=shear stress, (dynes per square centimeter (dyne/cm$^2$))
PV=plastic viscosity, (cP)=
$\dot{\gamma}$=shear rate, (s$^{-1}$)
YP=yield point, (lbf/100 ft$^2$)

The rheology of the geopolymer cement slurry composition may be evaluated from the plastic viscosity (PV) and the yield point (YP), which are parameters from the Bingham plastic rheology model. The PV is related to the resistance of the geopolymer cement slurry composition to flow due to mechanical interaction between the solids of the geopolymer cement slurry composition and represents the viscosity of the geopolymer cement slurry composition extrapolated to infinite shear rate. In other words, the PV is the slope of the shear stress versus shear rate curve of the Bingham plastic model. The PV reflects the type and concentration of the solids in the geopolymer cement slurry composition, and a lesser PV is preferred. The PV of the geopolymer cement slurry composition may be estimated by measuring the shear stress of the geopolymer cement slurry using a FANN® Model 35 viscometer at shear rates of 300 rpm and 600 rpm and subtracting the 300 rpm shear stress measurement from the 600 rpm shear stress measurement according to Equation 4.

$$PV = \theta_{600} - \theta_{300} \qquad \text{Equation 4}$$

Where
PV=plastic viscosity, (cP)
$\theta_{600}$=shear stress viscometer reading at 600 rpm, (lbf/100 ft$^2$)
$\theta_{300}$=shear stress viscometer reading at 300 rpm, (lbf/100 ft$^2$)

When the shear stress measurement at 600 rpm is not available, the plastic viscosity may be calculated by determining the difference between any two shear stress measurements, dividing the difference by the difference of the shear rates that the two shear stresses were measured at, and multiplying that factor by 300. This formula is provided in Equation 5.

$$PV = \frac{300}{N_2 - N_1} (\theta_{N_2} - \theta_{N_1}) \qquad \text{Equation 5}$$

Where
PV=plastic viscosity, (cP)
N=viscometer speed, shear rate (rpm)
$\theta_N$=shear stress viscometer reading at N rpm, (lbf/100 ft$^2$)

The YP represents the shear stress less than which the geopolymer cement slurry composition behaves as a rigid body and greater than which the geopolymer cement slurry composition flows as a viscous fluid. In other words, the YP represents the amount of stress required to move the geopolymer cement slurry composition from a static condition. The yield point is the resistance of initial flow of a fluid, or the stress required in order to move the fluid. It can be simply stated that the yield point is the attractive force among colloidal particles in geopolymer cement slurry. The YP of a geopolymer cement slurry composition is correlated with the capacity of the geopolymer cement slurry composition to carry rock cuttings through the annulus, which in simplified terms indicates the geopolymer cement slurry composition's hole-cleaning ability. The determination of yield points in geopolymer cement slurries is important in the overall description of slurry flow properties. Yield point affects both the start-up pressure after a temporary shut-down and the void filling properties of cements during cementing operations. YP of equal to or greater than 15 lbf/100 ft$^2$ is considered acceptable for drilling. The YP is determined by extrapolating the Bingham plastic rheology model to a shear rate of zero. In other words, the PV is the y-intercept of the shear stress v. shear rate curve of the Bingham plastic model. The YP of the geopolymer cement slurry composition may be estimated from the PV from Equation 5 by subtracting the PV from Equation 5 from the shear stress of the geopolymer cement slurry measured at 300 rpm according to Equation 6.

$$YP = \theta_{300} - PV \qquad \text{Equation 6}$$

The YP is expressed as a force per area, such as in field units of lbf/100 ft$^2$, for example. The YP may be converted to SI units of dyne/cm$^2$, as 1 lbf/100 ft$^2$=4.79 dyne/cm$^2$. The methods for measuring and determining PV and YP for the geopolymer cement slurry compositions having Saudi Arabian volcanic ash are consistent with methods conventionally used for geopolymer cement slurries in general.

The geopolymer cement slurry may have a plastic viscosity of from 50 to 350 cP. In other embodiments, the geopolymer cement slurry may have a plastic viscosity of from 50 to 350 cP, from 50 to 300 cP, from 50 to 200 cP, from 50 to 150 cP, from 50 to 125 cP, from 50 to 100 cP, from 50 to 80 cP, from 50 to 60 cP, from 60 to 350 cP, from 60 to 300 cP, from 60 to 200 cP, from 60 to 150 cP, from 60 to 125 cP, from 60 to 100 cP, from 60 to 80 cP, from 80 to 350 cP, from 80 to 300 cP, from 80 to 200 cP, from 80 to 150 cP, from 80 to 125 cP, from 80 to 100 cP, from 100 to 350 cP, from 100 to 300 cP, from 100 to 200 cP, from 100 to 150 cP, from 100 to 125 cP, from 100 to 100 cP, from 100 to 80 cP, from 125 to 350 cP, from 125 to 300 cP, from 125 to 200 cP, from 125 to 150 cP, from 150 to 350 cP, from 150 to 300 cP, from 150 to 200 cP, from 200 to 300 cP, from 200 to 350 cP, or from 300 to 350 cP.

The geopolymer cement slurry of the present disclosure may have a yield point of from 5 to 70 lbf/100 ft$^2$, from 5 to 60 lbf/100 ft$^2$, from 5 to 55 lbf/100 ft$^2$, from 5 to 40 lbf/100 ft$^2$, from 5 to 30 lbf/100 ft$^2$, from 5 to 25 lbf/100 ft$^2$, from 5 to 20 lbf/100 ft$^2$, from 5 to 15 lbf/100 ft$^2$, from 5 to 10 lbf/100 ft$^2$, from 10 to 70 lbf/100 ft$^2$, from 10 to 60 lbf/100 ft$^2$, from 10 to 55 lbf/100 ft$^2$, from 10 to 40 lbf/100 ft$^2$, from 10 to 30 lbf/100 ft$^2$, from 10 to 25 lbf/100 ft$^2$, from 10 to 20 lbf/100 ft$^2$, from 10 to 15 lbf/100 ft$^2$, from 15 to 70 lbf/100 ft$^2$, from 15 to 60 lbf/100 ft$^2$, from 15 to 55 lbf/100 ft$^2$, from 15 to 40 lbf/100 ft$^2$, from 15 to 30 lbf/100 ft$^2$, from 15 to 25 lbf/100 ft$^2$, from 15 to 20 lbf/100 ft$^2$, from 20 to 70 lbf/100 ft$^2$, from 20 to 60 lbf/100 ft$^2$, from 20 to 55 lbf/100 ft$^2$, from 20 to 40 lbf/100 ft$^2$, from 20 to 30 lbf/100 ft$^2$, from 20 to 25 lbf/100 ft$^2$, from 25 to 70 lbf/100 ft$^2$, from 25 to 60 lbf/100 ft$^2$, from 25 to 55 lbf/100 ft$^2$, from 25 to 40 lbf/100 ft$^2$, from 25 to 30 lbf/100 ft$^2$, from 30 to 70 lbf/100 ft$^2$, from 30 to 60 lbf/100 ft$^2$, from 30 to 55 lbf/100 ft$^2$, from 30 to 40 lbf/100 ft$^2$, from 40 to 70 lbf/100 ft$^2$, from 40 to 60 lbf/100 ft$^2$, from 40 to 55 lbf/100 ft$^2$, from 55 to 70 lbf/100 ft$^2$, from 55 to 60 lbf/100 ft$^2$, or from 60 to 70 lbf/100 ft$^2$.

The gel strength of a geopolymer cement slurry refers to the shear stress of the geopolymer cement slurry composition measured at a low shear rate (such as 3 rpm or 6 rpm) following a defined period of time during which the geopolymer cement slurry composition is maintained in a static state. The shear stress of the geopolymer cement slurry composition at low shear rate may be measured using a standard oilfield viscometer, such as a FANN® Model 35 viscometer operated at low rpms, such as at 3 rpm or 6 rpm, according to the test methods described in API Recommended Practice For Field Testing Water-Based Geopolymer cement slurries (RP 13B-1/ISO 10414-1:2002) published August 2014 and incorporated by reference into this disclosure in its entirety. To measure the gel strength, the geopolymer cement slurry composition is first stirred by contacting the geopolymer cement slurry composition with the spindle of the viscometer and operating the viscometer at 600 rotations per minute (rpm). The viscometer is then turned off for period of time (time period). For a 10-second gel strength, the time period is 10 seconds, and for a 10 minute gel strength, the time period is 10 minutes. It should be understood that other time periods for measuring gel strength may be used as reference times for measurements of gel strength. During the time period, the geopolymer cement slurry composition comes to rest in a static state. Upon expiration of the time period, the viscometer is turned back on at a low speed, such as 3 rpm for example, to generate a low shear rate. The viscometer reading is then taken. The gel strength of the geopolymer cement slurry composition is reported in units of lbf/100 ft$^2$.

The geopolymer cement slurry described in this disclosure may have a 10-second gel strength of from 5 to 50 lbf/100 ft$^2$, from 5 to 40 lbf/100 ft$^2$, from 5 to 35 lbf/100 ft$^2$, from 5 to 30 lbf/100 ft$^2$, from 5 to 25 lbf/100 ft$^2$, from 5 to 20 lbf/100 ft$^2$, from 5 to 15 lbf/100 ft$^2$, from 5 to 10 lbf/100 ft$^2$, from 10 to 50 lbf/100 ft$^2$, from 10 to 40 lbf/100 ft$^2$, from 10 to 35 lbf/100 ft$^2$, from 10 to 30 lbf/100 ft$^2$, from 10 to 25 lbf/100 ft$^2$, from 10 to 20 lbf/100 ft$^2$, from 10 to 15 lbf/100 ft$^2$, from 15 to 50 lbf/100 ft$^2$, from 15 to 40 lbf/100 ft$^2$, from 15 to 35 lbf/100 ft$^2$, from 15 to 30 lbf/100 ft$^2$, from 15 to 25 lbf/100 ft$^2$, from 15 to 20 lbf/100 ft$^2$, from 20 to 50 lbf/100 ft$^2$, from 20 to 40 lbf/100 ft$^2$, from 20 to 35 lbf/100 ft$^2$, from 20 to 30 lbf/100 ft$^2$, from 20 to 25 lbf/100 ft$^2$, from 25 to 50 lbf/100 ft$^2$, from 25 to 40 lbf/100 ft$^2$, from 25 to 35 lbf/100 ft$^2$, from 25 to 30 lbf/100 ft$^2$, from 30 to 50 lbf/100 ft$^2$, from 30 to 40 lbf/100 ft$^2$, from 30 to 35 lbf/100 ft$^2$, from 35 to 50 lbf/100 ft$^2$, from 35 to 40 lbf/100 ft$^2$, or from 40 to 50 lbf/100 ft$^2$. The 10-second gel strength of the geopolymer cement slurry composition having Saudi Arabian volcanic ash may be compared to a 10-second gel strength of a comparative geopolymer cement slurry without Saudi Arabian volcanic ash. The 10-second gel strength of the geopolymer cement slurry composition having Saudi Arabian volcanic ash may be less than or equal to 90% of the 10-second gel strength of the comparative geopolymer cement slurry, or less than or equal to 80% of the 10-second gel strength of the comparative geopolymer cement slurry, or less than or equal to 70% of the 10-second gel strength of the comparative geopolymer cement slurry.

The geopolymer cement slurry may have a 10 minute gel strength of from 10 to 60 lbf/100 ft$^2$, from 10 to 50 lbf/100 ft$^2$, from 10 to 45 lbf/100 ft$^2$, from 10 to 40 lbf/100 ft$^2$, from 10 to 30 lbf/100 ft$^2$, from 10 to 25 lbf/100 ft$^2$, from 10 to 20 lbf/100 ft$^2$, from 10 to 15 lbf/100 ft$^2$, from 15 to 60 lbf/100 ft$^2$, from 15 to 50 lbf/100 ft$^2$, from 15 to 45 lbf/100 ft$^2$, from 15 to 40 lbf/100 ft$^2$, from 15 to 30 lbf/100 ft$^2$, from 15 to 25 lbf/100 ft$^2$, from 15 to 20 lbf/100 ft$^2$, from 20 to 60 lbf/100 ft$^2$, from 20 to 50 lbf/100 ft$^2$, from 20 to 45 lbf/100 ft$^2$, from 20 to 40 lbf/100 ft$^2$, from 20 to 30 lbf/100 ft$^2$, from 20 to 25 lbf/100 ft$^2$, from 25 to 60 lbf/100 ft$^2$, from 25 to 50 lbf/100 ft$^2$, from 25 to 45 lbf/100 ft$^2$, from 25 to 40 lbf/100 ft$^2$, from 25 to 30 lbf/100 ft$^2$, from 30 to 60 lbf/100 ft$^2$, from 30 to 50 lbf/100 ft$^2$, from 30 to 45 lbf/100 ft$^2$, from 30 to 40 lbf/100 ft$^2$, from 35 to 60 lbf/100 ft$^2$, from 35 to 50 lbf/100 ft$^2$, from 35 to 45 lbf/100 ft$^2$, from 40 to 60 lbf/100 ft$^2$, from 40 to 50 lbf/100 ft$^2$, from 40 to 45 lbf/100 ft$^2$, from 45 to 60 lbf/100 ft$^2$, from 45 to 50 lbf/100 ft$^2$, or from 50 to 60 lbf/100 ft$^2$. The 10-minute gel strength of the geopolymer cement slurry composition having Saudi Arabian volcanic ash may be compared to a 10-minute gel strength of a comparative geopolymer cement slurry without Saudi Arabian volcanic ash. The 10-minute gel strength of the geopolymer cement slurry composition having Saudi Arabian volcanic ash may be less than or equal to 90% of the 10-minute gel strength of the comparative geopolymer cement slurry, or less than or equal to 80% of the 10-minute gel strength of the comparative geopolymer cement slurry, or less than or equal to 70% of the 10-minute gel strength of the comparative geopolymer cement slurry.

Further embodiments of the present disclosure relate to methods of using the geopolymer cement slurries previously described. In some embodiments, the method may include pumping the geopolymer cement slurry into a location to be cemented and curing the geopolymer cement slurry by allowing the aqueous solution and the Saudi Arabian volcanic ash to react. The location to be cemented may, for instance, be a well, a wellbore, an annulus, or other such locations.

Cementing is performed when the geopolymer cement slurry is deployed into the well via pumps, displacing the drilling fluids still located within the well, and replacing them with cement. The geopolymer cement slurry flows to the bottom of the wellbore through the casing, which will eventually be the pipe through which the hydrocarbons flow to the surface. From there, the geopolymer cement slurry fills in the space between the casing and the actual wellbore, and hardens. This creates a seal so that outside materials cannot enter the well flow, as well as permanently positions the casing in place. In preparing a well for cementing, it is important to establish the amount of cement required for the job. This may be done by measuring the diameter of the borehole along its depth, using a caliper log. Utilizing both mechanical and sonic means, multi-finger caliper logs measure the diameter of the well at numerous locations simultaneously in order to accommodate for irregularities in the wellbore diameter and determine the volume of the openhole. Additionally, the required physical properties of the cement are essential before commencing cementing operations. The proper set cement is also determined, including the density and viscosity of the material, before actually pumping the cement into the hole.

In some embodiments, curing the geopolymer cement slurry may refer to passively allowing time to pass under suitable conditions upon which the geopolymer cement slurry may harden or cure through allowing one or more reactions between the aqueous solution and the Saudi Arabian volcanic ash or cement precursor material, or both. Suitable conditions may be any time, temperature, pressure, humidity, and other appropriate conditions known in the cement industry to cure a cement composition. In some embodiments, suitable curing conditions may be ambient conditions. Curing may also involve actively hardening or curing the geopolymer cement slurry by, for instance, introducing a curing agent to the geopolymer cement slurry, providing heat or air to the geopolymer cement slurry, manipulating the environmental conditions of the geopolymer cement slurry to facilitate reactions between the aqueous solution and the Saudi Arabian volcanic ash or the cement precursor or both. Usually, the cement will be cured and convert from liquid to solid due to subsurface formation conditions, temperature, and pressure. In the laboratory, a curing chamber capable of applying temperature and pressure is used for curing the cement specimens at required conditions. Cubical molds (2"×2"×2") and cylindrical cells (1.4" diameter and 12" length) were lowered into the curing chamber. Pressures and temperatures were maintained until shortly before the end of the curing where they were reduced to ambient conditions.

In some embodiments, curing may occur at a relative humidity of greater than or equal to 80% in the geopolymer cement slurry and a temperature of greater than or equal to 50° F. for a time period of from 1 to 14 days. Curing may occur at a relative humidity of from 80% to 100%, such as from 85% to 100%, or 90% to 100%, or from 95% to 100% relative humidity in the geopolymer cement slurry. The geopolymer cement slurry may be cured at temperatures of greater than or equal to 50° F., such as greater than or equal to 75° F., greater than or equal to 80° F., greater than or equal to 100° F., or greater than or equal to 120° F. The geopolymer cement slurry may be cured at temperatures of from 50° F. to 250° F., or from 50° F. to 200° F., or from 50° F. to 150° F., or from 50° F. to 120° F. In some instances, the temperature may be as great as 500° F. The geopolymer cement slurry may be cured for from 1 day to 14 days, such as from 3 to 14 days, or from 5 to 14 days, or from 7 to 14 days, or from 1 to 3 days, or from 3 to 7 days.

Further embodiments of the present disclosure relate to particular methods of cementing a casing in a wellbore. The method may include mixing an aqueous solution and Saudi Arabian volcanic ash or a cement precursor material, or both, to form a geopolymer cement slurry, introducing the geopolymer cement slurry into an annulus between the casing and the wellbore, and curing the geopolymer cement slurry to cement the casing in the wellbore.

Introducing the geopolymer cement slurry into an annulus may include pumping a geopolymer cement slurry into the annulus between a casing and a wellbore and curing the geopolymer cement slurry. The geopolymer cement slurry may be in accordance with any of the embodiments previously described. Likewise, curing the geopolymer cement slurry may be in accordance with any of the embodiments previously described. As stated previously, Cementing is performed when the geopolymer cement slurry is deployed into the well via pumps, displacing the drilling fluids still located within the well, and replacing them with cement. The geopolymer cement slurry flows to the bottom of the wellbore through the casing, which will eventually be the pipe through which the hydrocarbons flow to the surface. From there it fills in the space between the casing and the actual wellbore, and hardens. This creates a seal so that outside materials cannot enter the well flow, as well as permanently positions the casing in place.

The method may further comprise adding one or more additives selected from the group consisting of dispersants, fluid loss control agents, retarders, expansion additives, antifoaming agents, stabilizers, accelerators, extenders, weighting agents, lost circulation control agents, surfactants, gypsum, hematite, manganese tetroxide, silica flour, and silica sand.

Embodiments of the disclosure also relate to methods of producing cured geopolymer cements. The method may include combining aqueous solution with Saudi Arabian volcanic ash. The geopolymer cement slurry may be in accordance with any of the embodiments previously described. The method may include curing the geopolymer cement slurry by allowing for a reaction between the aqueous solution and the Saudi Arabian volcanic ash or the cement precursor material, or both, to produce cured geopolymer cement. The curing step may be in accordance with any of the embodiments previously described.

In some embodiments, cement is composed of four main components: tricalcium silicate ($Ca_3O_5Si$) which contributes to the early strength development; dicalcium silicate ($Ca_2SiO_4$), which contributes to the final strength, tricalcium aluminate ($Ca_3Al_2O_6$), which contributes to the early strength; and tetracalcium alumina ferrite. These phases are sometimes called alite and belite respectively. In addition, gypsum may be added to control the setting time of cement.

In one embodiment, the silicates phase in cement may be about 75-80 wt. % of the total material. $Ca_3O_5Si$ is the major constituent, with concentration as great as 60-65 wt. %. The quantity of $Ca_2SiO_4$ conventionally does not exceed 20 wt. %, 30 wt. % or 40 wt. %. The hydration products for $Ca_3O_5Si$ and $Ca_2SiO_4$ are calcium silicate hydrate ($Ca_2H_2O_5Si$) and calcium hydroxide ($Ca(OH)_2$), also known as Portlandite. The calcium silicate hydrate commonly called CSH gel has a variable C:S and H:S ratio depending on the temperature, calcium concentration in the aqueous phase, and the curing time. The CSH gel comprises +/−70% of fully hydrated Portland cement at ambient conditions and is considered the principal binder of hardened cement. By contrast, the calcium hydroxide is crystalline with concentration of about 15-20 wt. % and is the reason the cement has a pH of greater than 7. Upon contact with the aqueous solution, the gypsum may partially dissolve, releasing calcium and sulphate ions to react with the aluminate and hydroxyl ions produced by the C3A to form a calcium trisulphoaluminate hydrate, known as the mineral ettringite ($Ca_6Al_2(SO_4)_3(OH)_{12} \cdot 26H_2O$) that will precipitate onto the $Ca_3O_5Si$ surfaces preventing further rapid hydration (flashset). The gypsum is gradually consumed and ettringite continues to precipitate until the gypsum is consumed. The sulphates ion concentration will drop down and the ettringite will become unstable converting to calcium monosulphoaluminate hydrate ($Ca_4Al_2O_6(SO_4) \cdot 14H_2O$). The remaining unhydrated $Ca_3O_5Si$ will form calcium aluminate hydrate. Geopolymer cement slurry design is based on the altering or inhibition of the hydration reactions with specific additives.

The cured geopolymer cement may include one or more of calcium hydroxide, silicates, oxides, belite ($Ca_2SiO_5$), alite ($Ca_3SiO_4$), tricalcium aluminate ($Ca_3Al_2O_6$), tetracalcium aluminoferrite ($Ca_4Al_2Fe_2O_{10}$), brownmilleriate ($4CaO \cdot Al_2O_3 \cdot Fe_2O_3$), gypsum ($CaSO_4 \cdot 2H_2O$) sodium oxide, potassium oxide, limestone, lime (calcium oxide), hexavalent chromium, trivalent chromium, calcium aluminate, other similar compounds, and combinations of these.

Without being bound by any particular theory, controlling the fluid loss and rheology properties of the geopolymer cement slurry when producing the cured geopolymer cement may result in a stronger, more stable cured geopolymer cement, as previously discussed. In some embodiments, the cured geopolymer cement of the present disclosure may have a compressive strength of from 1000 to 5000 pounds per square inch (psi) in the compressive Strength Test. In the test, the set cement cubes were removed from the molds, and placed in a hydraulic press where increasing force was exerted on each cube until failure. The hydraulic press system used in this study applied known compressive loads to the samples. This system was designed to test the compressive strength of sample cement cubes in compliance with API specifications for oil wells cement testing.

In some embodiments, the geopolymer cement slurry may contain an aqueous solution and may be water-based. As such, the geopolymer cement slurry may by hydrophilic, forming stronger bonds with water-wet surfaces. Well sections drilled with non-aqueous drilling fluids may have oil-wet surfaces, resulting in poor bonding between the well and the geopolymer cement slurry, as oil and water naturally repel. Poor bonding may lead to poor isolation and a buildup of unwanted casing-casing or tubing-casing annular pressure. Without being bound by theory, it is desirable to make the subsurface formation water wet, the casing water wet, or both, to enhance and improve the bonding between cement and casing and cement and subsurface formation. If the wettability of the subsurface formation or casing is oil wet not water wet then the bonding will be poor and could result in small gap(s) or channel(s) between the cement and casing or the cement and subsurface formation thereby resulting in improper wellbore isolation. This improper wellbore isolation could lead to fluid or gas escaping from the well through this gas or channel due to de-bonding.

EXAMPLES

Example 1

Wavelength Dispersive X-ray Fluorescence (WDXRF) may be used to conduct elemental analysis. In WDXRF spectrometers, all of the elements in the sample are excited simultaneously. The different energies of the characteristic radiation emitted from the sample are diffracted into different directions by an analyzing crystal or monochromer (similar to the action of a prism dispersing different colors of visible light into different directions). By placing the detector at a certain angle, the intensity of X-rays with a certain wavelength can be measured. Sequential spectrometers use a moving detector on a goniometer to move it through an angular range to measure the intensities of many different wavelengths. Simultaneous spectrometers are equipped with a set of fixed detection systems, where each system measures the radiation of a specific element.

For the WDXRF analysis, a sample of Saudi Arabian volcanic ash was homogenized and manually grounded by an agate mortar and a pestle for several minutes to achieve fine particle size. Then, 4 grams of the Saudi Arabian volcanic ash powder was mixed well and homogenized with 0.9 grams of a binder (Licowax C micropowder PM (Hoechstwax)). Then, the powder was pressed with 20 tons of pressure to a pellet with 31 millimeter (mm) diameter. WDXRF analysis was then performed on the sample using the standardless Omnian 27 method. The composition is shown in Table 1 to be presented.

TABLE 1

Composition of Saudi Arabian Volcanic Ash

| Element | Wt. % |
|---|---|
| O | 44.2 |
| Si | 21.8 |
| Al | 8.5 |
| Fe | 8.5 |
| Ca | 6.4 |
| Mg | 4.2 |
| Na | 3.1 |
| Ti | 1.5 |
| K | 1.0 |
| P | 0.3 |
| Mn | 0.1 |

The WDXRF results show that the sample consisted of mainly O and Si with appreciable amounts of Al, Fe, Ca, Mg, and Na.

Example 2

X-ray powder diffraction (XRD) is a rapid analytical technique primarily used for phase identification of a crystalline material and can provide information on unit cell dimensions. The analyzed material is finely ground, homogenized, and average bulk composition is determined. X-ray diffractometers consist of three basic elements: an X-ray tube, a sample holder, and an X-ray detector. X-rays are generated in a cathode ray tube by heating a filament to produce electrons, accelerating the electrons toward a target by applying a voltage, and bombarding the target material with electrons. When electrons have sufficient energy to dislodge inner shell electrons of the target material, characteristic X-ray spectra are produced. These spectra consist of several components, the most common being $K_\alpha$ and $K_\beta$. $K_\alpha$ consists, in part, of $K_{\alpha 1}$ and $K_{\alpha 2}$. $K_{\alpha 1}$ has a slightly shorter wavelength and twice the intensity as $K_{\alpha 2}$. The specific wavelengths are characteristic of the target material (Cu, Fe, Mo, Cr). Filtering, by foils or crystal monochromers, is required to produce the monochromatic X-rays needed for diffraction. $K_{\alpha 1}$ and $K_{\alpha 2}$ are sufficiently close in wavelength such that a weighted average of the two is used. These X-rays are collimated and directed onto the sample. As the sample and detector are rotated, the intensity of the reflected X-rays is recorded. A detector records and processes this X-ray signal and converts the signal to a count rate which is then output to a device such as a printer or computer monitor.

For the XRD analysis, a sample of Saudi Arabian volcanic ash was homogenized and manually grounded by an agate mortar and a pestle for several minutes to achieve fine particle size. Then, 4 grams of the fine Saudi Arabian volcanic ash powder was mounted into the XRD sample holder by back pressing. XRD was then performed on the sample using the SALAM 014 method. The composition is shown in Table 2 to be presented.

TABLE 2

XRD Composition of Saudi Arabian Volcanic Ash

| Compound | Wt. % |
|---|---|
| Amorphous Material | 70 |
| Labradorite: $Ca_{0.65}Na_{0.32}(Al_{1.62}Si_{2.38}O_8)$ | 19 |
| Augite: $Ca(Fe, Mg)Si_2O_6$ | 6 |
| Forsterite: $Mg_2SiO_4$ | 5 |

The XRD results show that the sample consisted mainly of amorphous material with appreciable amounts of labradorite, augite, and forsterite. The WDXRF results confirmed the XRD findings.

Example 3

Geopolymer cement slurries were made in accordance with the previous description. The compositions of these samples are described in the tables to be presented.

TABLE 3

Compositions of Examples A, B, C, and D

| | Water (mL) | Na₂SiO₃ | NaOH (6 Molar solution) (mL) | Saudi Arabian Volcanic Ash (g) | Retarder (g) |
|---|---|---|---|---|---|
| Example A | 400 | 75.6 g | 52.57 | 600 | |
| Example B | 350 | 75.6 g | 52.57 | 600 | |
| Example C | 300 | 75.6 g | 52.57 | 600 | 6 |
| Example D | 80 | 52.2 mL | 28.2 | 300 | |
| Example E | 200 | 105 | 0 | 600 | |

A-3L is commercially available from BJ Service Company Limited (headquartered in Houston, Tex.), and includes from 30% to 40% $Na_2SiO_3$. The retarder was HR®-5, available from Halliburton. The $Na_2SiO_3$ for Examples A, B, and C was in solid form, available from Sanjel Corporation in Al Khobar, Kingdom of Saudi Arabia. The $Na_2SiO_3$ for Examples D and E was A-3L solution, commercially available from BJ Service Company Limited (headquartered in Houston, Tex.), and includes from 30% to 40% $Na_2SiO_3$. A-3L has a pH of 10.5 to 11.5.

Physical properties of each sample were then measured and are provided in the tables to be presented.

TABLE 4

Physical Properties for Examples A, B, C, and D

| Property | Thickening Time | BHCT | BC Final | Pressure | Density | pH ($Na_2SiO_3$ and water) | pH ($Na_2SiO_3$, NaOH, and water) |
|---|---|---|---|---|---|---|---|
| Example A | 12 hours, 57 minutes | 106° F. | 100 | 2300 psi | 105 lb/ft³ | 12.40 | 13.04 |
| Example B | — | 106° F. | 8 | 2400 psi | 107 lb/ft³ | 12.39 | 12.97 |
| Example C | — | 106° F. | 9 | 2400 psi | 110 lb/ft³ | 12.30 | 12.84 |
| Example D | — | 106° F. | 100 | — | 110 lb/ft³ | 11.19 | 12.6 |

TABLE 5

Viscometer Data for Examples A and D

| RPM | 600 | 300 | 200 | 100 | 6 | 3 |
|---|---|---|---|---|---|---|
| Example A | 37 | 20 | 15 | 9 | 3 | 3 |
| Example D | 91 | 52 | 40 | 28 | 21 | 19 |

TABLE 6

Rheology Data for Examples A and D

| | PV | YP | 10 second gel strength | 10 minute gel strength |
|---|---|---|---|---|
| Example A | 17 cP | 3 lbf/100ft² | 3 lbf/100ft² | 18 lbf/100ft² |
| Example D | 39 cP | 13 lbf/100ft² | 31 lbf/100ft² | 110 lbf/100ft² |

The thickening time for Example A was determined to be approximately 12 hours and 57 minutes at 106° F. and approximately 2300 psi, using a Chandler Engineering Consistometer Model 8340 according to API Spec 10 Code Schedule(1), API Recommended Practice 10B-2, and the Chandler Engineering Instruction Manual. The thickening time for Example A was determined to be approximately 2 hours at 106° F. and approximately 2300 psi, using a Chandler Engineering Consistometer Model 8340 according to API Spec 10 Code Schedule(1), API Recommended Practice 10B-2, and the Chandler Engineering Instruction Manual.

The compressive strength for the geopolymer cement was measured by a hydraulic press with a destructive crush test using API RP 10B procedure. The compressive strength for Example D was determined to be 2229 psi. The compressive strength for Example E was determined to be less than 400 psi. This exhibits that removing the NaOH significantly affects the compressive strength of the geopolymer cement. The compressive strength of Example E was more than 1800 psi less than the compressive strength of Example D. Because Example E has about double the amount of water, $NaSiO_3$, and Saudi Arabian volcanic ash of Example D, the compressive strengths should be about the same if Example E had NaOH. However, since Example E removed the NaOH, the lesser compressive strength is entirely due to the removal of the NaOH.

Examples A, B, C, and D had densities less than 170 lb/ft³, whereas conventional cement slurries conventionally have a density greater than 170 lb/ft³. Having a density of less than 170 lb/ft³ may lead to consistent flowability and uniform placement of the geopolymer cement slurry with resin. It may be desirable to reduce the density of the geopolymer cement slurry to reduce the hydrostatic pressure exerted by the geopolymer cement slurry onto the subsurface formation. Additionally, it is desirable that the geopolymer cement slurry has a density of from 1 to 100 pcf, from 1 to 50 pcf, from 1 to 20 pcf, from 1 to 10 pcf, from 1 to 7 pcf, from 1 to 5 pcf, from 1 to 4 pcf, from 1 to 3 pcf, from 1 to 2 pcf, from 2 to 100 pcf, from 2 to 50 pcf, from 2 to 20 pcf, from 2 to 10 pcf, from 2 to 7 pcf, from 2 to 5 pcf, from 2 to 4 pcf, from 2 to 3 pcf, from 3 to 100 pcf, from 3 to 50 pcf, from 3 to 20 pcf, from 3 to 10 pcf, from 3 to 7 pcf, from 3 to 5 pcf, from 3 to 4 pcf, from 4 to 100 pcf, from 4 to 50 pcf, from 4 to 20 pcf, from 4 to 10 pcf, from 4 to 7 pcf, from 4 to 5 pcf, from 5 to 100 pcf, from 5 to 50 pcf, from 5 to 20 pcf, from 5 to 10 pcf, from 5 to 7 pcf, from 7 to 100 pcf, from 7 to 50 pcf, from 7 to 20 pcf, from 7 to 10 pcf, from 10 to 100 pcf, from 10 to 50 pcf, from 10 to 20 pcf, from 20 to 100 pcf, from 20 to 50 pcf, or from 50 to 100 pcf greater than the density of the subsurface formation. This may be desirable to avoid a kick.

It is noted that Example D had a greater YP (13 lbf/100 ft²) than the YP of Example A (3 lbf/100 ft²) this is likely due to the increased ratio of Saudi Arabian Volcanic Ash to water, and shows how the Saudi Arabian Volcanic Ash functions as an extender. Example D had 300 g Saudi Arabian Volcanic Ash and 80 mL water, whereas Example A had 600 g Saudi Arabian Volcanic Ash and 400 mL water. It may be desirable to increase the yield point of the geopolymer cement slurry to reduce the penetration of the geopolymer cement slurry into the subsurface formation and to increase the reduction of lost circulation.

Example 4

Saudi Arabian volcanic ash and water were mixed together in the amounts shown below:

TABLE 13

Composition of Example F

| Component | Amount |
| --- | --- |
| Water | 350 mL |
| Saudi Arabian Volcanic Ash | 600 g |

TABLE 12

Rheology Data for Example F

| | |
| --- | --- |
| 600 rpm | 55 |
| 300 rpm | 18 |
| 200 rpm | 13 |
| 100 rpm | 7 |
| 6 rpm | 3 |
| 3 rpm | 2 |
| PV | 37 cP |
| YP | 19 lbf/100ft$^2$ |
| 10 second gel strength | 2 lbf/100ft$^2$ |
| 10 minute gel strength | 3 lbf/100ft$^2$ |

It was observed that Example F did not thicken without the addition of the $Na_2SiO_3$, NaOH.

It is noted that one or more of the following claims utilize the term "where" or "in which" as a transitional phrase. For the purposes of defining the present technology, it is noted that this term is introduced in the claims as an open-ended transitional phrase that is used to introduce a recitation of a series of characteristics of the structure and should be interpreted in like manner as the more commonly used open-ended preamble term "comprising." For the purposes of defining the present technology, the transitional phrase "consisting of" may be introduced in the claims as a closed preamble term limiting the scope of the claims to the recited components or steps and any naturally occurring impurities. For the purposes of defining the present technology, the transitional phrase "consisting essentially of" may be introduced in the claims to limit the scope of one or more claims to the recited elements, components, materials, or method steps as well as any non-recited elements, components, materials, or method steps that do not materially affect the novel characteristics of the claimed subject matter. The transitional phrases "consisting of" and "consisting essentially of" may be interpreted to be subsets of the open-ended transitional phrases, such as "comprising" and "including," such that any use of an open ended phrase to introduce a recitation of a series of elements, components, materials, or steps should be interpreted to also disclose recitation of the series of elements, components, materials, or steps using the closed terms "consisting of" and "consisting essentially of." For example, the recitation of a composition "comprising" components A, B, and C should be interpreted as also disclosing a composition "consisting of" components A, B, and C as well as a composition "consisting essentially of" components A, B, and C. Any quantitative value expressed in the present application may be considered to include open-ended embodiments consistent with the transitional phrases "comprising" or "including" as well as closed or partially closed embodiments consistent with the transitional phrases "consisting of" and "consisting essentially of."

As used in the Specification and appended Claims, the singular forms "a", "an", and "the" include plural references unless the context clearly indicates otherwise. The verb "comprises" and its conjugated forms should be interpreted as referring to elements, components or steps in a non-exclusive manner. The referenced elements, components or steps may be present, utilized or combined with other elements, components or steps not expressly referenced.

It should be understood that any two quantitative values assigned to a property may constitute a range of that property, and all combinations of ranges formed from all stated quantitative values of a given property are contemplated in this disclosure. The subject matter of the present disclosure has been described in detail and by reference to specific embodiments. It should be understood that any detailed description of a component or feature of an embodiment does not necessarily imply that the component or feature is essential to the particular embodiment or to any other embodiment.

It should be apparent to those skilled in the art that various modifications and variations may be made to the embodiments described within without departing from the spirit and scope of the claimed subject matter. Thus, it is intended that the specification cover the modifications and variations of the various embodiments described within provided such modifications and variations come within the scope of the appended claims and their equivalents. Unless otherwise stated within the application, all tests, properties, and experiments are conducted at room temperature and atmospheric pressure.

Having described the subject matter of the present disclosure in detail and by reference to specific embodiments of any of these, it is noted that the various details disclosed within should not be taken to imply that these details relate to elements that are essential components of the various embodiments described within, even in cases where a particular element is illustrated in each of the drawings that accompany the present description. Further, it should be apparent that modifications and variations are possible without departing from the scope of the present disclosure, including, but not limited to, embodiments defined in the appended claims. More specifically, although some aspects of the present disclosure are identified as particularly advantageous, it is contemplated that the present disclosure is not necessarily limited to these aspects.

What is claimed is:

1. A geopolymer cement slurry comprising:

an aqueous solution;

Saudi Arabian volcanic ash, in which the Saudi Arabian volcanic ash is free of $TiO_2$ and comprises:

from 0.05 wt. % to 0.2 wt. % $SO_3$, from 5 wt. % to 10 wt. % CaO, from 40 wt. % to 50 wt. % $SiO_2$, from 10 wt. % to 20 wt. % $Al_2O_3$, from 10 wt. % to 15 wt. % $Fe_2O_3$,
from 5 wt. % to 10 wt. % MgO, and
from 0.5 wt. % to 5 wt. % $K_2O$;
in which the Saudi Arabian volcanic ash comprises labradorite, augite, and forsterite;
25 to 50 wt. % $Na_2SiO_3$;
15 to 35 wt. % NaOH; and
a sodium aluminosilicate hydrate having a structure of:

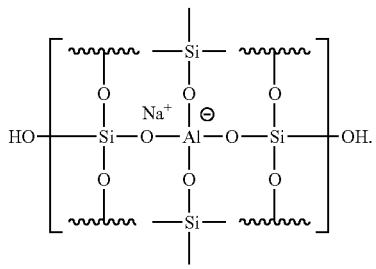

2. The geopolymer cement slurry of claim 1, in which the $Na_2SiO_3$ has a ratio of $Na_2O$ to $SiO_2$ of from 0.250:1 to 0.350:1.

3. The geopolymer cement slurry of claim 1, in which the geopolymer cement slurry comprises a pH of from 11.6-13.0.

4. The geopolymer cement slurry of claim 1, in which the Saudi Arabian volcanic ash has a particle size of from 20 to 30 μm.

5. The geopolymer cement slurry of claim 1, in which the Saudi Arabian volcanic ash comprises from 40 wt. % to 50 wt. % $SiO_2$ and from 10 wt. % to 20 wt. % $Al_2O_3$.

6. The geopolymer cement slurry of claim 1, in which the geopolymer cement slurry comprises a sodium aluminosilicate hydrate having a compressive strength of from 1500 to 2600 psi.

7. The geopolymer cement slurry of claim 1, in which the geopolymer cement slurry comprises a sodium aluminosilicate hydrate having a formula of:
$Na_n[(-SiO_2)_z-AlO_2]_n \cdot yH_2O$, where n represents a degree of polymerization ranging 1 to 50 and z represents an amount of silicate ranging from 2 to 10.

8. The geopolymer cement slurry of claim 1, in which aqueous solution comprises deionized water, tap water, fresh water, salt water, natural or synthetic brine, municipal water, formation water, produced water, well water, filtered water, distilled water, sea water, or combinations of these.

9. The geopolymer cement slurry of claim 1, in which the geopolymer cement slurry comprises from 30 to 60 wt. % Saudi Arabian volcanic ash.

10. The geopolymer cement slurry of claim 1, in which the geopolymer cement slurry further comprises a cement precursor material comprising one or more components selected from the group consisting of calcium hydroxide, silicates, belite ($Ca_2SiO_5$), alite ($Ca_3SiO_4$), tricalcium aluminate ($Ca_3Al_2O_6$), tetracalcium aluminoferrite ($Ca_4Al_2Fe_2O_{10}$), brownmillerite ($4CaO \cdot Al_2O_3 \cdot Fe_2O_3$), gypsum ($CaSO_4 \cdot 2H_2O$), sodium oxide, potassium oxide, lime (calcium oxide), hexavalent chromium, trivalent chromium, calcium aluminate, and combinations thereof.

11. The geopolymer cement slurry of claim 1, in which the geopolymer cement slurry further comprises one or more additives selected from the group consisting of dispersants, fluid loss control agents, retarders, expansion additives, antifoaming agents, stabilizers, accelerators, extenders, weighting agents, lost circulation control agents, surfactants, gypsum, hematite, manganese tetroxide, silica flour, and silica sand.

12. The geopolymer cement slurry of claim 1, in which the geopolymer cement slurry has a ratio of $Na_2SiO_3$ combined with NaOH to $Al_2O_3$ ranges from 0.5:1.0 to 9.0:1.0.

13. The geopolymer cement slurry of claim 1, in which:
the $Na_2SiO_3$ has a ratio of $Na_2O$ to $SiO_2$ of from 0.250:1 to 0.350:1;
the geopolymer cement slurry comprises a pH of from 11.6-13.0;
the Saudi Arabian volcanic ash has a particle size of from 20 to 30 μm; and
the Saudi Arabian volcanic ash comprises from 40 wt. % to 50 wt. % $SiO_2$ and from 10 wt. % to 20 wt. % $Al_2O_3$.

14. The geopolymer cement slurry of claim 1, in which:
the aqueous solution comprises deionized water, tap water, fresh water, salt water, natural or synthetic brine, municipal water, formation water, produced water, well water, filtered water, distilled water, sea water, or combinations of these;
the geopolymer cement slurry comprises from 30 to 60 wt. % Saudi Arabian volcanic ash;
the geopolymer cement slurry further comprises a cement precursor material comprising one or more components selected from the group consisting of calcium hydroxide, silicates, belite ($Ca_2SiO_5$), alite ($Ca_3SiO_4$), tricalcium aluminate ($Ca_3Al_2O_6$), tetracalcium aluminoferrite ($Ca_4Al_2Fe_2O_{10}$), brownmillerite ($4CaO \cdot Al_2O_3 \cdot Fe_2O_3$), gypsum ($CaSO_4 \cdot 2H_2O$), sodium oxide, potassium oxide, lime (calcium oxide), hexavalent chromium, trivalent chromium, calcium aluminate, and combinations thereof; and
the geopolymer cement slurry further comprises one or more additives selected from the group consisting of dispersants, fluid loss control agents, retarders, expansion additives, antifoaming agents, stabilizers, accelerators, extenders, weighting agents, lost circulation control agents, surfactants, gypsum, hematite, manganese tetroxide, silica flour, and silica sand.

15. The geopolymer cement slurry of claim 1, in which the geopolymer cement slurry comprises from 10 to 40 wt. % water.

16. The geopolymer cement slurry of claim 1, in which the geopolymer cement slurry comprises a yield point of from 5 to 70 lbf/100 $ft^2$.

17. The geopolymer cement slurry of claim 1, in which the geopolymer cement slurry comprises a plastic viscosity of from 50 to 350 cP.

18. The geopolymer cement slurry of claim 1, in which the geopolymer cement slurry comprises a 10-second gel strength of from 5 to 50 lbf/100 $ft^2$.

19. The geopolymer cement slurry of claim 1, in which the geopolymer cement slurry comprises a thickening time at 100° F. of greater than 5 hours.

* * * * *